(12) United States Patent
Ishizaka

(10) Patent No.: US 8,558,838 B2
(45) Date of Patent: Oct. 15, 2013

(54) IMAGE PROCESSING APPARATUS, IMAGE PROCESSING METHOD AND STORAGE MEDIUM STORING IMAGE PROCESSING PROGRAM

(75) Inventor: Kanya Ishizaka, Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1794 days.

(21) Appl. No.: 11/319,162

(22) Filed: Dec. 28, 2005

(65) Prior Publication Data

US 2007/0002080 A1     Jan. 4, 2007

(30) Foreign Application Priority Data

Jul. 1, 2005   (JP) .................................. 2005-194051

(51) Int. Cl.
*G06T 11/00* (2006.01)
*G06T 11/20* (2006.01)
*G06T 11/40* (2006.01)
G09G 5/20 (2006.01)
G09G 5/24 (2006.01)

(52) U.S. Cl.
CPC ............... *G06T 11/203* (2013.01); *G06T 11/40* (2013.01); *G09G 5/20* (2013.01); *G09G 5/24* (2013.01)
USPC ........ 345/467; 345/468; 345/469; 345/469.1; 345/470; 345/472; 345/611

(58) Field of Classification Search
CPC ........ G06T 11/203; G06T 11/40; G09G 5/24; G09G 5/20
USPC ............... 345/611–613, 467–469, 469.1, 472
See application file for complete search history.

(56) References Cited

U.S. PATENT DOCUMENTS

| | | | | |
|---|---|---|---|---|
| 5,878,161 A * | 3/1999 | Ishida et al. | ................... | 382/198 |
| 6,201,528 B1 * | 3/2001 | Lucas et al. | ................... | 345/611 |
| 6,392,660 B2 * | 5/2002 | Karjalainen | ................... | 345/660 |
| 6,654,017 B1 * | 11/2003 | Ali-Santosa | ................... | 345/443 |
| 6,756,992 B2 * | 6/2004 | Toji et al. | ................... | 345/613 |
| 6,791,569 B1 * | 9/2004 | Millet et al. | ................... | 345/611 |
| 6,927,780 B2 * | 8/2005 | Guleryuz et al. | ............. | 345/611 |
| 6,982,723 B1 * | 1/2006 | Szymaniak | ................... | 345/611 |
| 6,985,159 B2 * | 1/2006 | Brown | ........................ | 345/611 |
| 7,006,109 B2 * | 2/2006 | Toji et al. | ................... | 345/613 |
| 7,102,650 B2 * | 9/2006 | Okada et al. | ................... | 345/615 |
| 7,158,148 B2 * | 1/2007 | Toji et al. | ................... | 345/613 |
| 7,164,430 B2 * | 1/2007 | Jiao et al. | ................... | 345/611 |
| 2002/0009237 A1 * | 1/2002 | Tezuka et al. | ................... | 382/299 |
| 2002/0015046 A1 * | 2/2002 | Okada et al. | ................... | 345/613 |
| 2003/0020729 A1 * | 1/2003 | Toji et al. | ................... | 345/613 |
| 2005/0162427 A1 * | 7/2005 | Momozono et al. | .......... | 345/467 |

FOREIGN PATENT DOCUMENTS

| JP | A 07-334648 | 12/1995 |
|---|---|---|
| JP | A 10-336697 | 12/1998 |
| JP | A 2003-283811 | 10/2003 |
| JP | A 2005-039802 | 2/2005 |

* cited by examiner

Primary Examiner — Jin-Cheng Wang
(74) Attorney, Agent, or Firm — Oliff & Berridge, PLC

(57) ABSTRACT

An image processing apparatus to perform an enlarging process for an original image constituted by C colors (C≥2) includes a target color selecting unit that selects two target colors C1 and C2 for each local region of the original image, a sorting unit that sorts the local region on the basis of a layout of the target colors selected by the target color selecting unit, and a processing unit that determines pixel values after enlargement from the target colors C1 and C2 in accordance with a result of the sorting performed by the sorting unit.

34 Claims, 30 Drawing Sheets

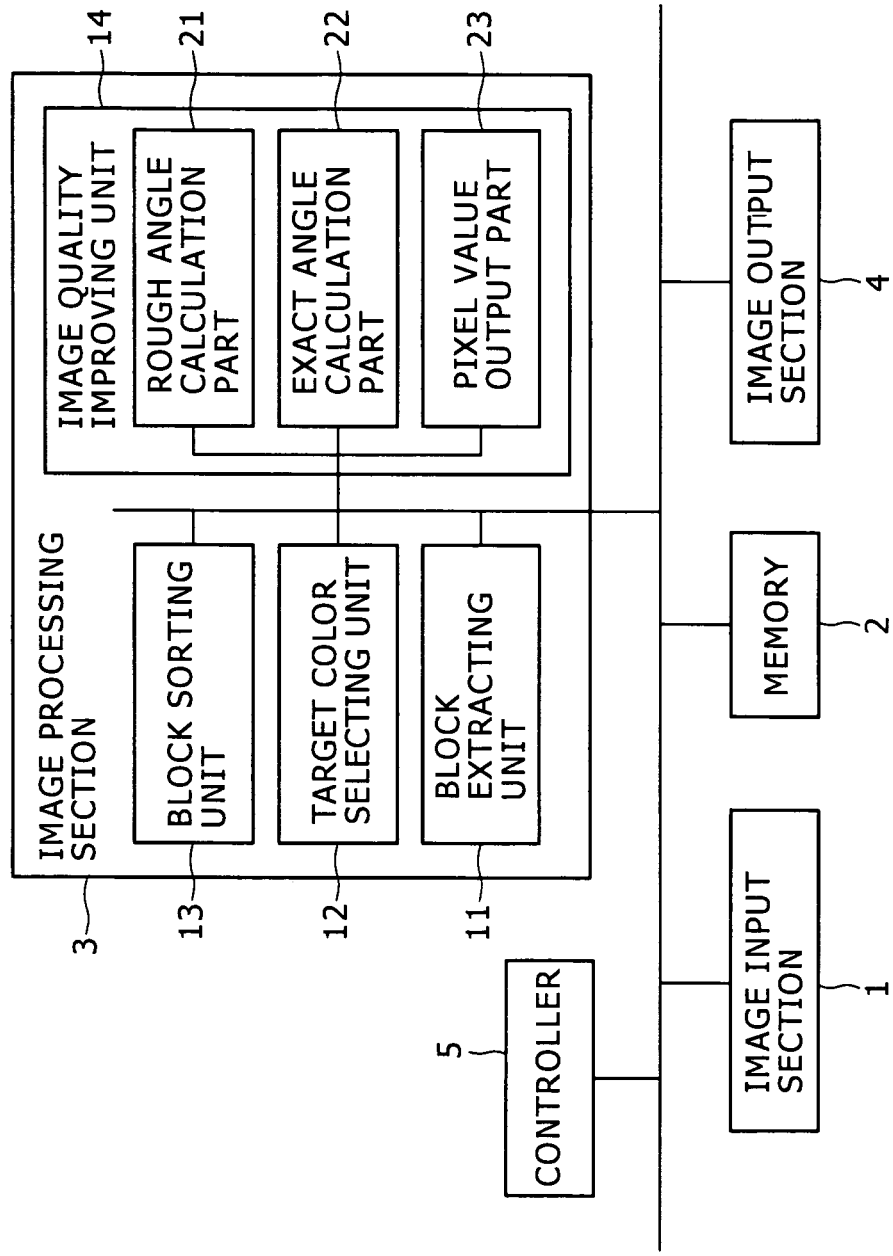
F I G. 1

ORIGINAL IMAGE

ONE 2×2 BLOCK IMAGE

FIG. 11
(A) LEFT CONNECTION LENGTH=2, RIGHT CONNECTION LENGTH=1
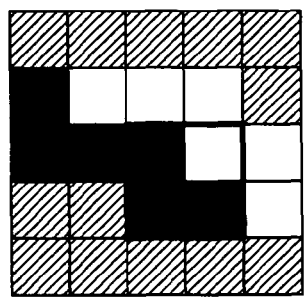
(B) LEFT CONNECTION LENGTH=1, RIGHT CONNECTION LENGTH=2
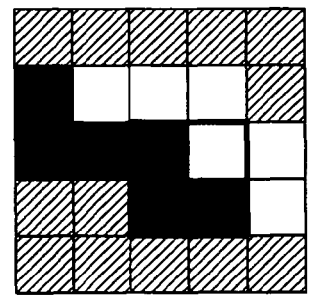
(C)
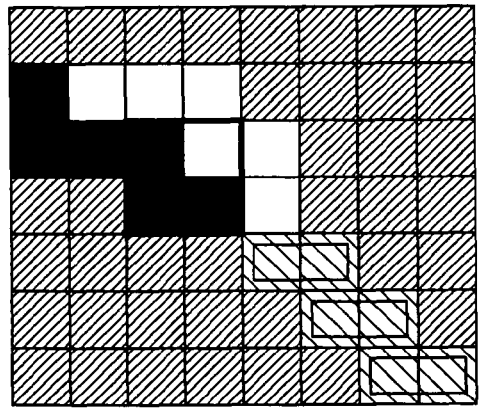
(D)
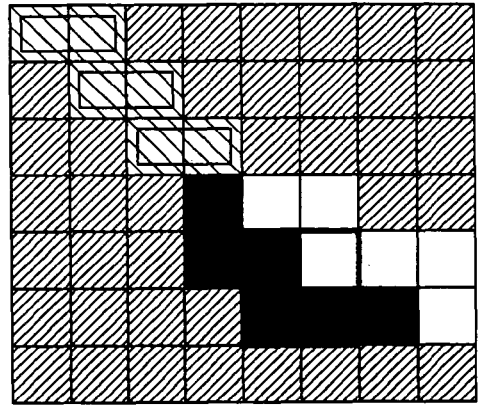
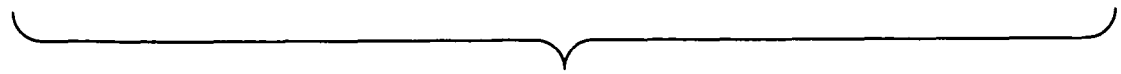

FIG. 12
(A) UPPER CONNECTION LENGTH=2, LOWER CONNECTION LENGTH=1
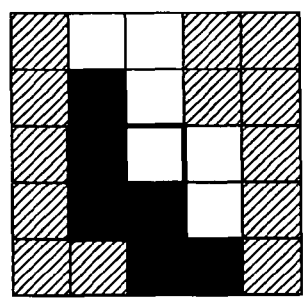
(B) UPPER CONNECTION LENGTH=1, LOWER CONNECTION LENGTH=2
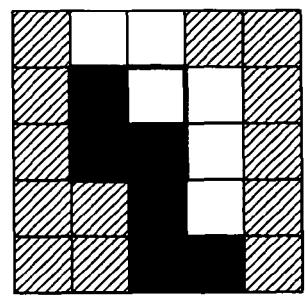
(C)
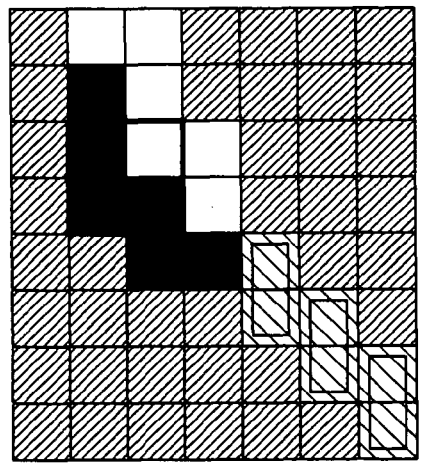
(D)
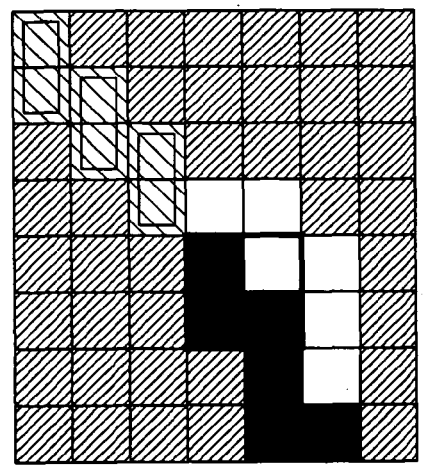

FIG.15
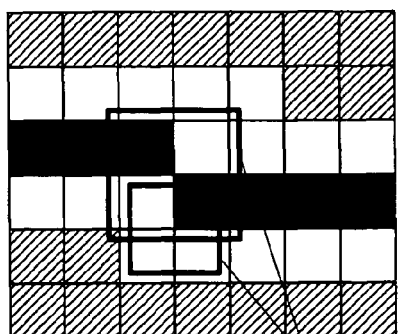
(A)
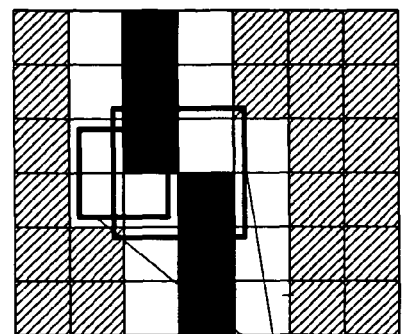
(B)
C1 THICK LINE PROCESSING AT TWO PLACES
C1 THICK LINE PROCESSING AT TWO PLACES
FIG.16
(A) 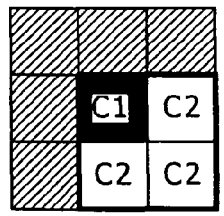
(B) 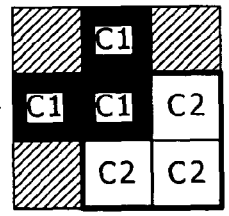
(D) 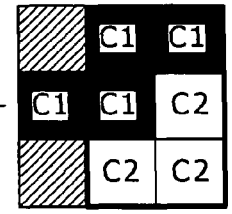 HORIZONTAL DIRECTION
(C) OTHERS
(E) 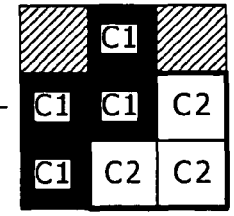 VERTICAL DIRECTION
■ C1 PIXEL
□ C2 PIXEL
▨ ARBITRARY PIXEL (ANY COLOR)
(F) OTHERS

FIG.18
(A) LEFT CONNECTION LENGTH=2, RIGHT CONNECTION LENGTH=1
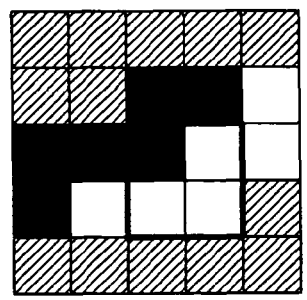
(B) LEFT CONNECTION LENGTH=1, RIGHT CONNECTION LENGTH=2
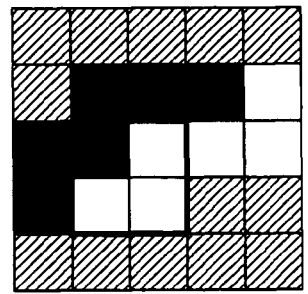
(C)
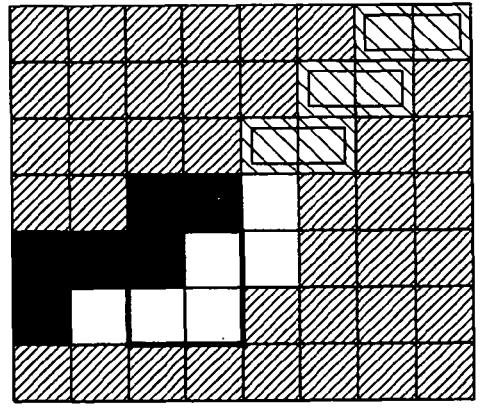
(D)
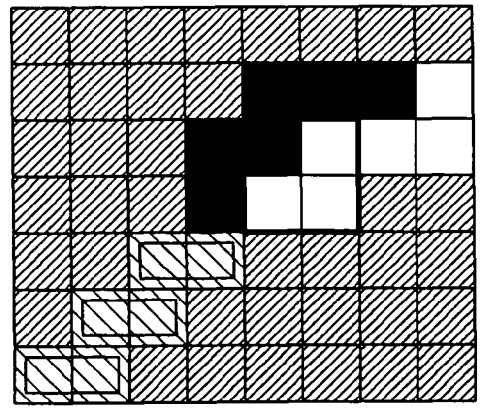

FIG.19
(A) UPPER CONNECTION LENGTH=2, LOWER CONNECTION LENGTH=1
(B) UPPER CONNECTION LENGTH=1, LOWER CONNECTION LENGTH=2
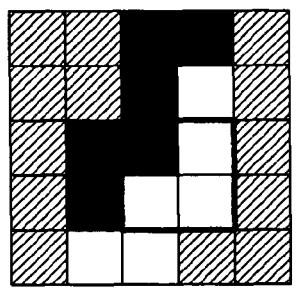
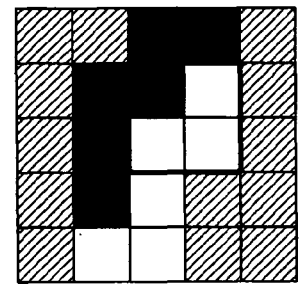
(C)
(D)
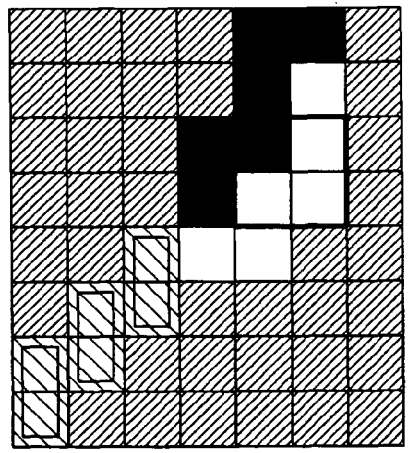
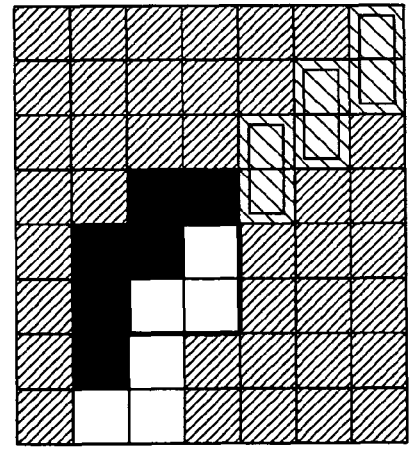

FIG.22
(A) 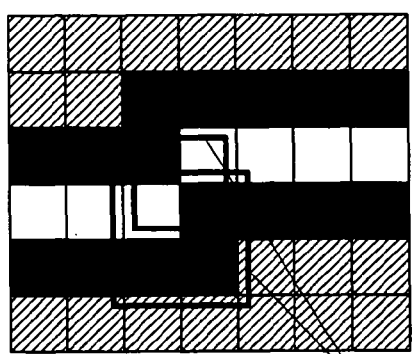
(B) 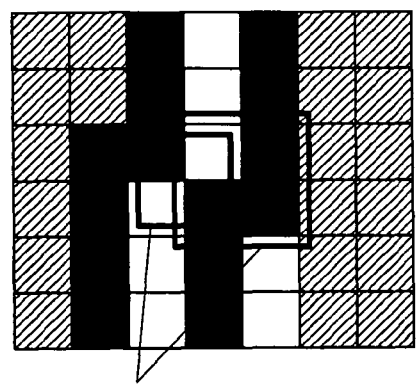
C2 THICK LINE PROCESSING AT TWO PLACES
C2 THICK LINE PROCESSING AT TWO PLACES

FIG. 23
(A)
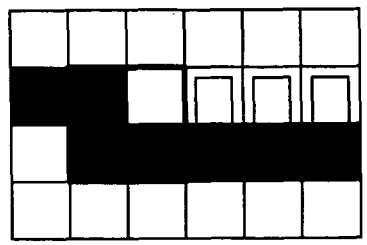
(C)
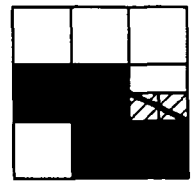
(B)
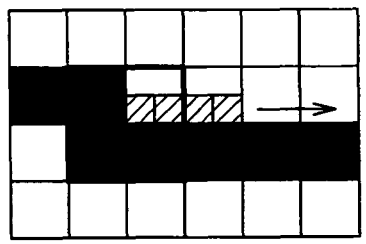
(D)
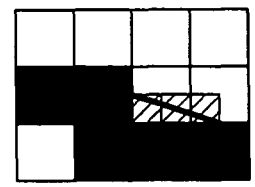
(E)
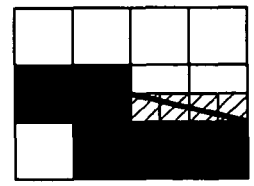
(F)
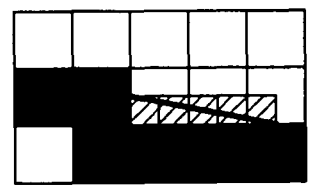

FIG.25
(A)
(B)
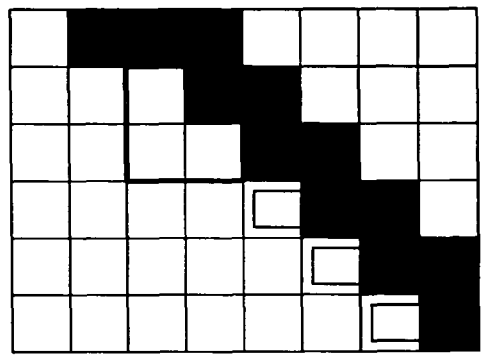
(C)
(D)
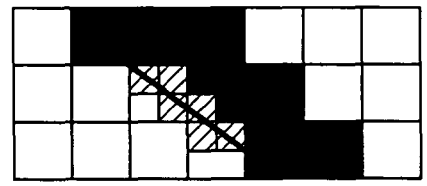
(E)
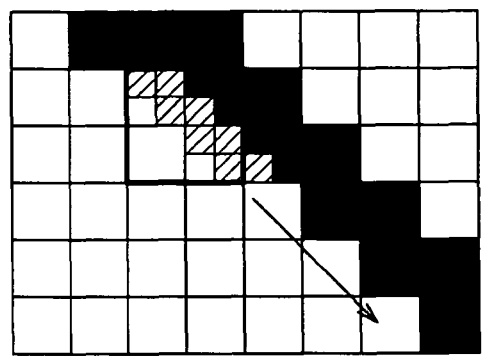
(F)
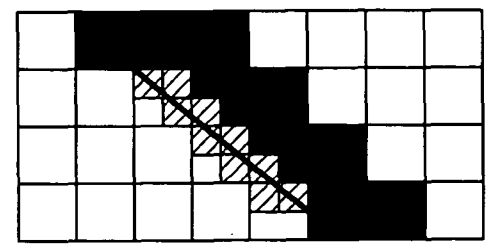

F I G . 2 6
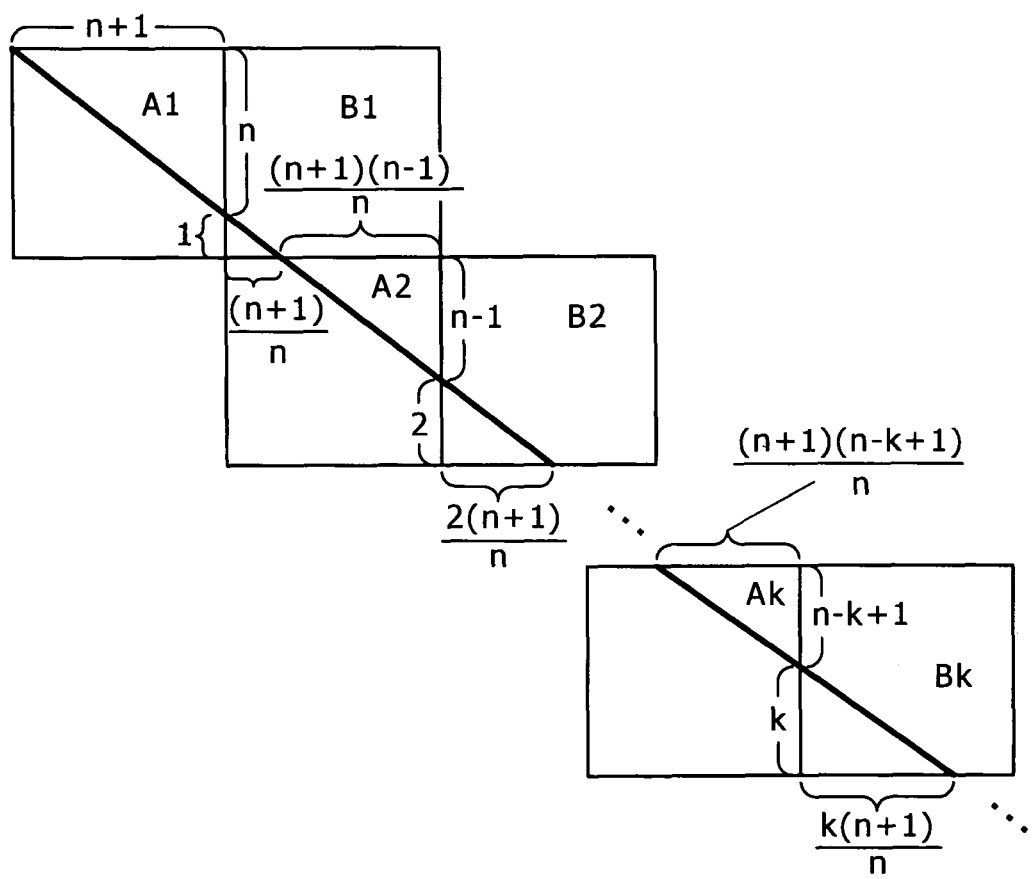

FIG.30

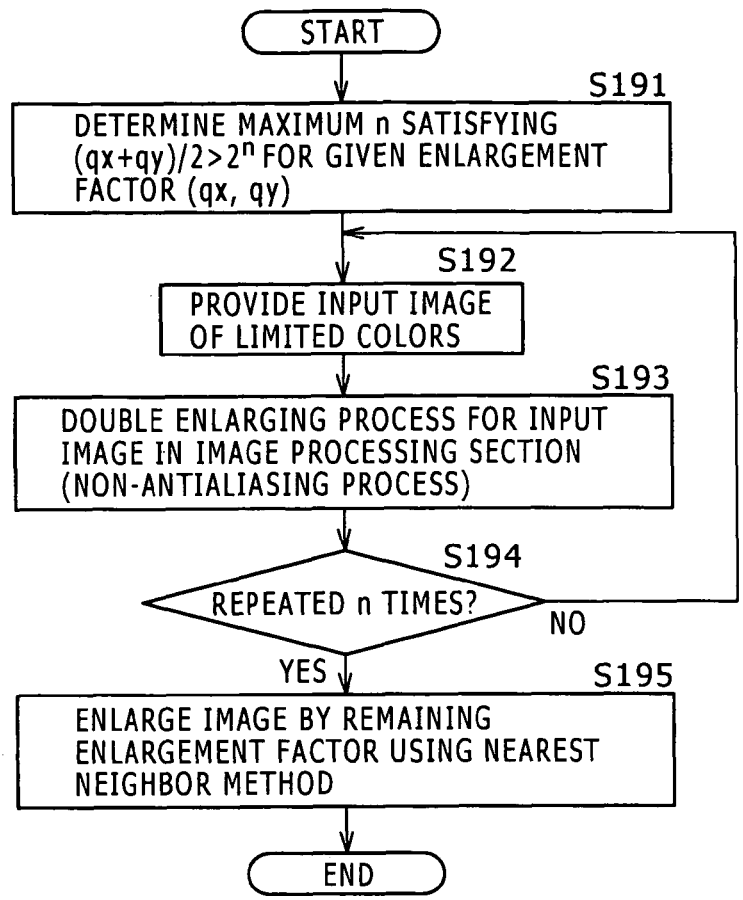

START
↓ S191
DETERMINE MAXIMUM n SATISFYING $(qx+qy)/2 > 2^n$ FOR GIVEN ENLARGEMENT FACTOR $(qx, qy)$
↓ S192
PROVIDE INPUT IMAGE OF LIMITED COLORS
↓ S193
DOUBLE ENLARGING PROCESS FOR INPUT IMAGE IN IMAGE PROCESSING SECTION (NON-ANTIALIASING PROCESS)
↓ S194
REPEATED n TIMES? — NO (loop back to S192)
YES ↓ S195
ENLARGE IMAGE BY REMAINING ENLARGEMENT FACTOR USING NEAREST NEIGHBOR METHOD
↓
END

FIG.31

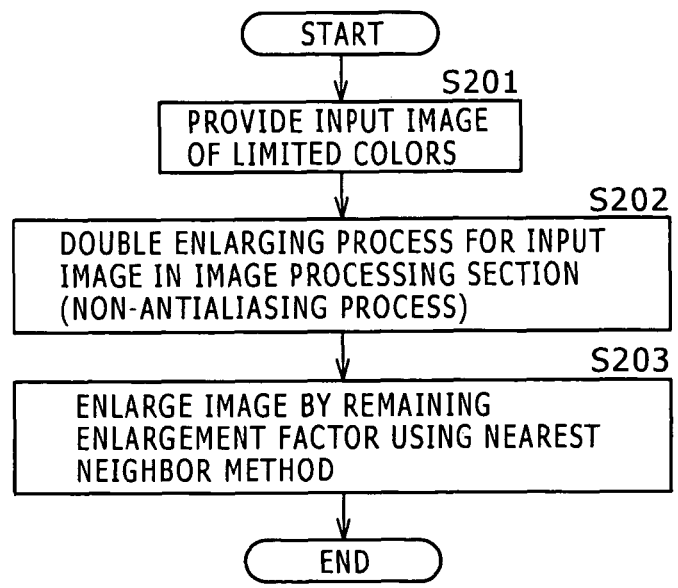

START
↓ S201
PROVIDE INPUT IMAGE OF LIMITED COLORS
↓ S202
DOUBLE ENLARGING PROCESS FOR INPUT IMAGE IN IMAGE PROCESSING SECTION (NON-ANTIALIASING PROCESS)
↓ S203
ENLARGE IMAGE BY REMAINING ENLARGEMENT FACTOR USING NEAREST NEIGHBOR METHOD
↓
END

IMAGE PROCESSING APPARATUS, IMAGE PROCESSING METHOD AND STORAGE MEDIUM STORING IMAGE PROCESSING PROGRAM

CROSS-REFERENCE TO RELATED APPLICATION

This application claims priority under 35 USC 119 from Japanese Patent Application No. 2005-194051, the disclosure of which is incorporated by reference herein.

BACKGROUND

1. Technical Field

The present invention relates to a technique for improving the quality of an image when print-outputting or display-outputting an inputted digital image of limited colors to, for example, a printer or a display.

2. Related Art

With the recent widespread distribution of electronic documents, it is generally requested to display or print digital images in high quality. For display or printing in high quality, an image quality improving technique is needed. Particularly, considerable attention is paid to an enlarging technique for outputting images in high quality to output devices of different resolutions. For example, in the case of outputting an image of 75 dpi in display resolution to a printer having a resolution of, say, 600 dpi, it is required to enlarge the image eight times as large as its original size. Of course, the enlarging process is applied also in the case of enlarging an image to a larger size.

Digital images can be classified according to the number of colors used throughout the whole of each image. For example, an image photographed with a digital camera contains a large number of colors and can be classified as a contone image. There is no clear definition of the contone image, but it can simply be considered to be an image in which 257 or more colors are used. For example, images which are outputted by a printer or a facsimile can be classified as binary images because there are used only two colors of black and white.

Further, as an image positioned intermediate between the contone image and the binary image there is a limited color image. Although there is no clear definition of the limited color image, either, it can simply be considered to be an image in which 255 or less colors are used throughout the entire image. In this sense, the binary image can be regarded as an image using only two colors out of limited color images and thus it can be said that the binary image corresponds to a special case of the limited color image.

Limited color images can be classified into images each prepared by reducing the number of colors of a contone image to 256 colors, e.g., a 256-color image obtained by reducing the number of colors of a natural image, and images each having 256 colors or less as an original number of colors, e.g., map, topographical map and GIS (geographical information system) information, CAD image and graphic image. As an exception, for example, an image resulting from gray conversion of a contone image of RGB and an image resulting from division of RGB are both images of 256 or less colors. Naturally, however, these images are regarded as contone images without including them in the category of limited color images.

Thus, a limited color image is expressed by only a small number of colors, e.g., 8, 16, or 256 colors, and these expressed colors can be associated with one another by, for example, a color map which is not obvious, and the image can be made into an image not subjected to an antialiasing process.

The antialiasing process is a technique for diminishing jaggy which appears at an edge portion of image. In the case of a limited color image, the antialiasing process is an image processing technique for multicolorizing an image to create a look of a smooth edge. Since the image is multicolored, the image having been subjected to the antialiasing process exhibits a stronger nature of a contone image than the limited color image.

By the antialiasing process, the edge portion becomes smooth in appearance and the image quality is improved, but the image quality can be improved also by enlarging the image to improve the resolution. FIG. 33 is explanatory diagram showing an example of an image quality improving process related to a conventional limited color image enlarging process. As noted above, the antialiasing process and the enlarging process for enlarging the resolution are known as image quality improving processes. Further, an antialiasing-enlarging process is also known as the combination process of the antialiasing process and the enlarging process as shown in FIG. 33. It can be said that the antialiasing-enlarging process is a process of a generic concept in comparison with each of the antialiasing process and the enlarging process. That is, if an image having been subjected to the antialiasing-enlarging process is again made into a limited color image, the image obtained is an enlarged image relative to the original image, and if a mean value contraction is applied to the original image size, there is obtained an antialiased image relative to the original image.

FIGS. 34A to 34H are explanatory diagrams showing an example of a relation between the image quality improving process and the concept of area occupancy. If an inherent edge line can be estimated as in FIG. 34B with respect to an original image shown in FIG. 34A, it is possible to obtain images of improved quality as in FIGS. 34C to 34F in terms of an area occupancy with the edge line crossing pixels. FIG. 34C is an antialiased image, FIG. 34D is an enlarged image, FIG. 34E is an antialiased-enlarged image, and FIG. 34F is a dot size modulated image. For the convenience of illustration, the difference of color is represented by different hatchings. Black and white portions need not always be black and white actually.

For example, with respect to a circled pixel in FIG. 34B, it is here assumed that the area occupancy of a black portion is 40% and that the color of the black portion is C1 and that of the white pixel is C2. Then, the value of the circled pixel can be obtained in terms of $C1 \times 0.4 + C2 \times 0.6$. Also in the case of enlargement, the same calculation may be performed for pixels after the enlargement.

By thus processing each of pixels in the original image, for example by such a pixel-by-pixel processing as shown in FIG. 34G, the antialiased image shown in FIG. 34C is obtained. Moreover, for example as shown in FIG. 34H, if 2×2 pixels are produced from one pixel in the original image, there is obtained an antialiased-enlarged image as shown in FIG. 34E. If this antialiased-enlarged image is again made into a limited color image, there is obtained such an enlarged image as shown in FIG. 34D. If the antialiased-enlarged image shown in FIG. 34E is subjected to a mean value contraction, there is obtained such an antialiased image as shown in FIG. 34C. If the area occupancy of each pixel in the original image shown in FIG. 34B is replaced as it is by the size of pixel, there is obtained such a dot size modulated image as shown in FIG. 34F.

The above subject that an image is to be enlarged in high quality is a subject common to digital images. However, as noted above, generally-employed digital images are classified into several types and are different in properties, so for enlargement in high image quality it is necessary to adopt a method which takes the respective properties into account.

SUMMARY

According to an aspect of the present invention, there is provided an image processing apparatus to perform an enlarging process for an original image constituted by C colors (C≥2), including a target color selecting unit that selects two target colors C1 and C2 for each local region of the original image, a sorting unit that sorts the local region on the basis of a layout of the target colors selected by the target color selecting unit, and a processing unit that determines pixel values after enlargement from the target colors C1 and C2 in accordance with a result of the sorting performed by the sorting unit.

BRIEF DESCRIPTION OF THE DRAWINGS

An embodiment of the present invention will be described in detail based on the following figures, wherein:

FIG. 1 is a block diagram showing a system according to an embodiment of the present invention;

FIGS. 11A to 11D are explanatory diagrams showing an example of an exact calculation in a 45° direction performed when the 2×2 block is the C1 thick line and the connecting direction is a horizontal direction;

FIGS. 12A to 12D are explanatory diagrams showing an example of an exact angle calculation in the 45° direction performed when the 2×2 block is the C1 thick line and the connecting direction is a vertical direction;

FIGS. 15A and 15B are explanatory diagrams of block positions in the case of performing a second C1 thick line processing when the block concerned is classified to the C1 thick line after being determined to be a thin line;

FIGS. 16A to 16F are diagrams showing an example of a rough angle calculation processing for a 2×2 block sorted to a C2 thick line;

FIGS. 18A to 18D are explanatory diagrams showing an example of an exact angle calculation performed when the 2×2 block is the C2 thick line and the connecting direction is a horizontal 45° direction;

FIGS. 19A to 19D are explanatory diagrams showing an example of an exact angle calculation performed when the 2×2 block is the C2 thick line and the connecting direction is a vertical 45° direction;

FIGS. 22A and 22B are explanatory diagrams of block positions in the case of performing a second C2 thick line processing when the block concerned is sorted to the C2 thick line after being determined to be a thin line;

FIGS. 23A to 23F are explanatory diagrams showing an example of a pixel layout based on an exact angle calculation processing and an image improving process for the C1 thick line in a horizontal direction;

FIGS. 25A to 25F are explanatory diagrams showing an example of a pixel layout based on an image quality improving process for the C1 thick line in the 45° direction;

FIG. 26 is an explanatory diagram of an area occupancy of an edge line relative to the C1 thick line in the 45° direction;

FIG. 30 is a flowchart showing another example of an enlarging process with an arbitrary enlargement factor;

FIG. 31 is a flowchart showing a further example of an enlarging process with an arbitrary enlargement factor;

DETAILED DESCRIPTION

Figure 2:
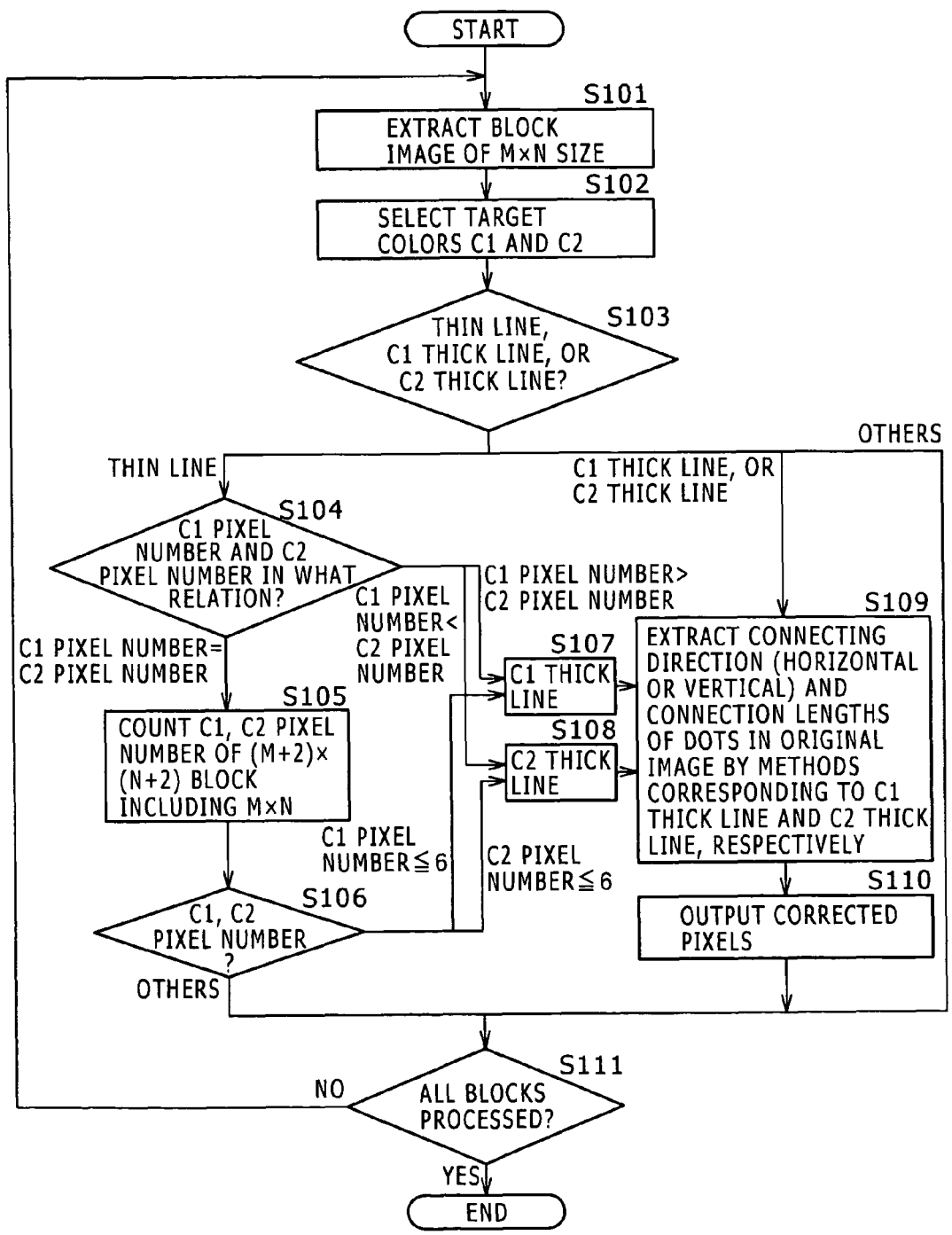
FIG. 2 is a flowchart showing an example of operation of an image processing section 3 in the embodiment.

FIG. 1 is a block diagram showing an example of a system according to an embodiment of the present invention. In the same figure, the reference numeral 1 denotes an image input section, 2 denotes a memory, 3 denotes an image processing section, 4 denotes an image output section, 5 denotes a controller, 11 denotes a block extracting unit, 12 denotes a target color selecting unit, 13 denotes a block sorting unit, 14 denotes an image quality improving unit, 21 denotes a rough angle calculation part, 22 denotes an exact angle calculation part, and 23 denotes a pixel value output part. The constituent blocks of the image quality improving section 3 and the controller 5 shown in FIG. 1 may be present as processing program modules on a computer or may be configured partially or wholly by a dedicated hardware.

The image input section 1 inputs digitized, limited color image data from the exterior of the system shown in FIG. 1 and transfers it to the memory 2. The memory 2 stores image data inputted from the image input section 1, image data after improvement of image quality, and various interim calculation results and processing parameters used in an image quality improving process. The image processing section 3 performs an image quality improving process for an image to be processed which is stored in the memory 2. The image output section 4 outputs image data improved in image quality by the image processing section 3 to the exterior of the system shown in FIG. 1. The controller 5 controls processings for various constituent portions.

The image processing section 3 includes the block extracting unit 11, target color selecting unit 12, block sorting unit 13 and image quality improving unit 14. The block extracting unit 11 extracts blocks (hereinafter referred to as M×N blocks) of M×N pixel size as a local region from the interior of an original image.

The target color selecting unit 12 selects two target colors C1 and C2 from predetermined positions in each of the M×N blocks extracted by the block extracting unit 11.

The block sorting unit 13 sorts the M×N blocks extracted by the block extracting unit 11 in accordance with the type of a line segment included in the blocks. Also when the stroke width is ∞, this is included as "line." Therefore, sorting blocks and sorting line segments are synonymous. As an example of sorting, it is possible to make sorting into a thin line, a thick line, etc. The thick line can be further sorted into first and second thick lines. Of course, it is possible to make further subdivision. It is here assumed that the first and second thick lines are a C1 thick line and a C2 thick line, respectively. The C1 and C2 represent target colors selected by the target color selecting unit 12. As to the blocks sorted to the thin line, re-sorting is made to any one of the first thick line (C1 thick line), second thick line (C2 thick line), and others on the basis of a pixel value in a block not larger than (M+2)×(N+2) pixel size including the M×N block.

With respect to the blocks sorted to the thin line, first thick line (C1 thick line) and second thick line (C2 thick line) by the block sorting unit 13, the image quality improving unit 14 performs an image quality improving process corresponding to each sorting. As to the blocks sorted to the thin line as described above, by making re-sorting to the thick line (C1 thick line), second thick line (C2 thick line) and others, it is possible to utilize the image quality improving process corresponding to the first and second thick lines (C1, C2 thick lines). In the image quality improving process performed by the image quality improving unit 14, an edge direction is estimated and an antialiased image or an antialiased-enlarged image or an enlarged image is generated in accordance with an area occupancy in the edge direction. Of course, the image quality improving process is not limited to this process, but the image quality improving method to be described uses this method.

Further, as to blocks sorted to the first thick line (C1 thick line) after sorted to the thin line in the block sorting unit 13, the image quality improving unit 14 applies an image quality improving process as the first thick line (C1 thick line) to a predetermined portion, and as to blocks sorted to the second thick line (C2 thick line) after sorted to the thin line, the image quality improving unit 14 applies an image quality improving process as the second thick line (C2 thick line) to a predetermined portion.

The image improving unit 14 includes the rough angle calculation part 21, the exact angle calculation part 22 and the pixel value output part 23. The rough angle calculation part 21 determines, as a rough angle, to which of horizontal and vertical directions the M×N blocks extracted by the block extracting unit 11 belong on the basis of pixels of blocks having a predetermined size of not larger than (M+1)×(N+1) pixel size of the original image including the M×N blocks.

In the case where the rough angle determined by the rough angle calculation part 21 is in the horizontal direction, the exact angle calculation part 22 calculates exactly an angle on the basis of a continued length of a predetermined pattern in each of right and left directions of the blocks. When the rough angle is in the vertical direction, the angle is calculated exactly on the basis of a continued length of the predetermined pattern in each of up and down directions of the blocks. Further, when the angle determined in the determination processing by the exact angle calculation part 22 satisfies predetermined conditions and is close to 45°, the angle is again calculated exactly on the basis of a continued length of the predetermined pattern in the predetermined 45° direction.

In accordance with the angle obtained in the exact angle calculation part 22, the pixel value output part 23 outputs a predetermined number of pixel values to predetermined positions within an image quality-improved image corresponding to the M×N blocks. In this processing there may be performed, for example, an antialiasing process or antialiasing-enlarging process using an area occupancy with the angle obtained in the exact angle calculation part 22 as an edge direction or an enlarging process based on those processes. In the image quality improving unit 14, the processings of the first thick line (C1 thick line) and the second thick line (C2 thick line) are performed symmetrically except predetermined position information such as pixel reference start position and write start position. According to the configuration of the image quality improving unit 14, it is possible to consider that the rough angle calculation part 21 and the exact angle calculation part 22 recognize directionality of a line segment contained in blocks and that the pixel value output part 23 performs an image quality improving process in accordance with the recognized direction.

Since the image processing section 3 is for processing a limited color image, there may be provided a processing unit which determines whether an inputted image is a limited color image or not, or the processing may be ended if the inputted image is not a limited color image.

A further description will now be given about the image processing section 3 which is a principal section. In the following description it is assumed that an inputted original image is a limited color image and that M=2, N=2 and the first thick line is the C1 thick line and the second is the C2 thick line. In an explanation of a concrete example, reference will be made to the execution of an antialiasing-double enlarging process, but it goes without saying that the processing may be either an antialiasing process or an enlarging process.

FIG. 2 is a flowchart showing an example of operation of the image processing section 3 in the embodiment. As preparations before the start of operation, a memory region for storing an 8-bit value image of a double size in each of length and breadth of an original image is ensured in the memory 2 and the original image is initialized using a pixel value enlarged by a known method such as the nearest neighbor method. The memory region is a region to write images for quality improvement (antialiased-enlarged images) outputted from the image processing section 3, which images are to be improved in quality by the image quality improving unit 14. The double enlarging process can be done, for example, in an enlarging process unit (not shown) present within the image processing section 3 or in the controller 5. These components constitute an enlarging unit in the present invention.

In this example, the pixel value of the inputted original image may be a color value itself or may be a color pallet number. In the latter case, a color map is usually attached to a header of the image, so in accordance with the color map, an actual color may be determined from the pallet number stored in the original image and this color value may be used as a pixel value or the color pallet number itself may be used as a pixel value. However, as will be described later, when outputting an image quality-improved pixel value in an image quality improving unit 14, it is necessary to calculate the pixel value by an appropriate method in each of the above cases.

Figure 3:
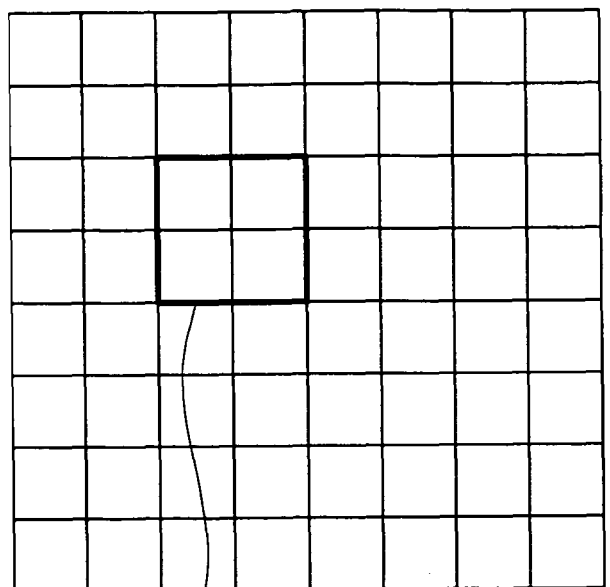
FIG. 3 is an explanatory diagram showing an example of a 2×2 block image extracted by a block extracting unit 11.

First, in S101, block images of M×N pixel size are extracted from an original image by the block extracting unit 11. Since M=2 and N=2 in this example, block images (2×2 block) of 2×2 pixel size are extracted. FIG. 3 is an explanatory diagram showing an example of a 2×2 block image extracted by the block extracting unit 11. In the block extracting unit 11, block images of 2×2 pixel size which are shifted pixel by pixel are extracted successively from an end of the original image. Then, with the extracted block images as an object of processing, the image quality is improved by the following processing and outputted pixel values are written in corresponding positions within the memory 2. The processing which follows is a processing for one block image and a description will be given below about this processing.

Referring back to FIG. 2, in S102, target colors C1 and C2 are selected from a block image of M×N pixel size extracted by the block extracting unit 11. In this example, M=2, N=2 and the left and right pixels of the upper 2×1 block are always selected as C1 and C2, respectively, in the 2×2 block.

In S103, with respect to one 2×2 block which has been extracted by the block extracting unit 11 in S101, it is determined to which of a thin line, C1 thick line, C2 thick line, and others, the pattern thereof belongs. FIGS. 4A to 4D are explanatory diagrams showing an example of a 2×2 block sorting method. It is determined that the pattern is a thin line when the same color (C2) is present on the left lower side and the right upper side and the color on the right lower side is C3≠C2, as shown in FIG. 4A, and also when the same color (C1) is present on the left upper side and the right lower side and the color on the left lower side is C4≠C1, as shown in FIG. 4B. Further, it is determined that the pattern is the C1 thick line when the left upper, left lower and right lower pixels are the same color (C1) as in FIG. 4C and it is determined that the pattern is the C2 thick line when the left lower, right upper and right lower pixels are the same color (C2) as in FIG. 4D. There are two types of such thin lines as shown in FIGS. 4A and 4B. Pixel values of C3 and C4 may be arbitrary values insofar as they satisfy the relation of C3≠C2, C4≠C1.

The image quality improving process is independent of concrete colors of C1 and C2. In the following description, therefore, for the convenience of explanation, the color C1 of the left upper pixel in the 2×2 block will be shown in solid black, while the color C2 of the right upper pixel will be shown in framed white. The four patterns shown in FIG. 4 can be called checks, L shape, and inverted L shape, which are pattern shapes, assuming that the two thin lines are the same. Therefore, this way of designation will also be used in the following description. If the left upper pixel is C1, checks, L shape, and inverted L shape, correspond to a thin line, C1 thick line, and C2 thick line, respectively. It will be seen that, by making the left upper pixel C1, the same relation is established even when the pattern colors shown in FIG. 4 are replaced.

Figure 4:
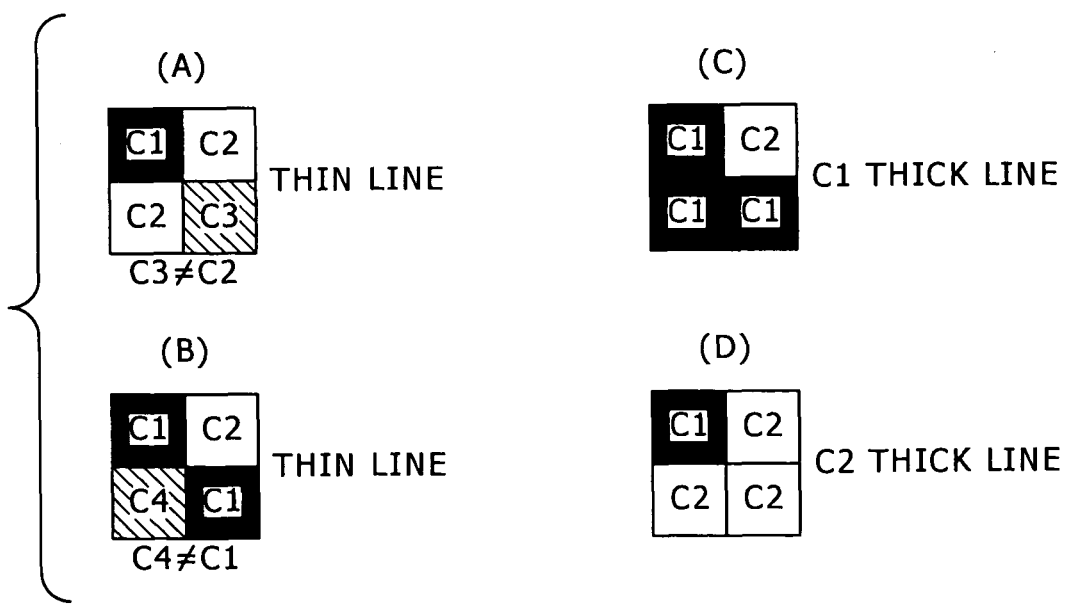
FIGS. 4A to 4D are explanatory diagrams showing an example of a method for sorting 2×2 blocks.
Figure 5:
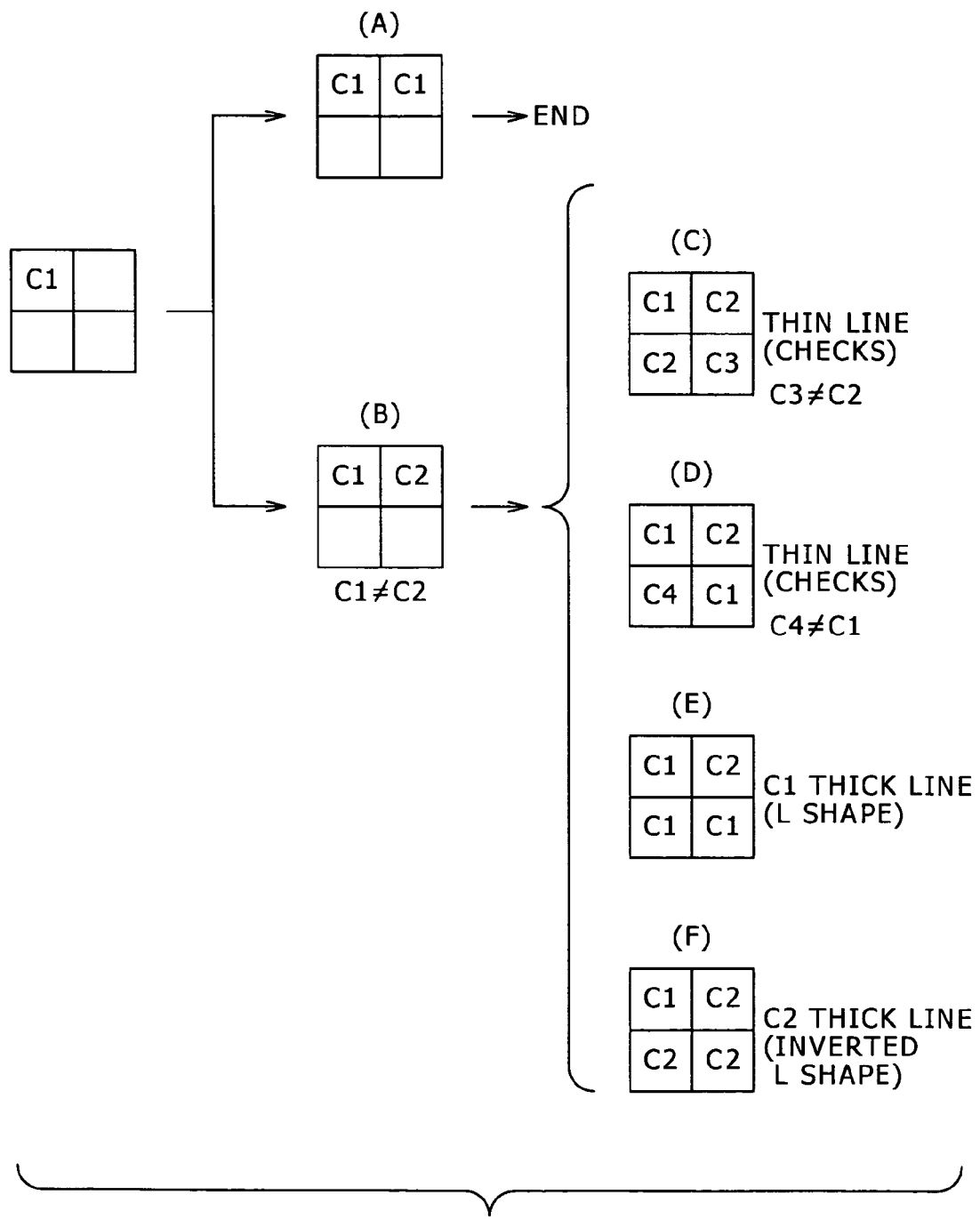
FIG. 5 are explanatory diagrams showing an example of a method for sorting 2×2 blocks on the basis of upper 2×1 pixels.

In each of the four patterns shown in FIG. 4, the two pixel values lying on the upper side of the 2×2 block are different between C1 and C2. Therefore, when determining to which of a thin line (checks), C1 thick line (L shape) and C2 thick line (inverted L shape) each pattern corresponds, first a check may be made to see whether or not the two upper pixel values C1 and C2 in the 2×2 block are different and thereafter a decision may be made which pattern the block concerned is FIG. 5 are explanatory diagrams showing an example of a sorting method based on upper 2×1 pixels in a 2×2 block. For example, when both upper pixels in the 2×2 block are the same as in FIG. 5A, it can be judged that the pattern concerned corresponds to none of the thin line (checks), C1 thick line (L shape) and C2 thick line (inverted L shape). For example, this is true of the case where all the four pixels are of the same color, or the two upper pixels and the two lower pixels are different in color, or each of the lower pixels is different in color from the upper pixels.

In the case where two pixel values on the upper side are different as in FIG. 5B, there is the possibility that the pattern concerned may be any of the thin line (checks), C1 thick line (L shape) and C2 thick line (inverted L shape) shown in FIGS. 5C to 5F. Thus, there may be adopted a construction such that a pattern corresponding to any of the thin line (checks), C1 thick line (L shape) and C2 thick line (inverted L shape) is detected when the two upper pixel values are different as in FIG. 5B.

If the pattern concerned corresponds to none of the thin line (checks), C1 thick line (L shape) and C2 thick line (inverted L shape) even in the cases of FIGS. 5A and 5B, an image improving process is not performed in this example for the 2×2 block concerned, but the processing flow advances to S111, in which it is determined whether all of 2×2 blocks have been checked. If there still remain any 2×2 blocks not checked yet, the processing flow returns to S101, in which the next 2×2 block is extracted. Thus, in this example, processing is performed only when the target colors C1 and C2 selected from the upper 2×1 block in the 2×2 block are different. As the case where the pattern concerned is none of the thin line (checks), C1 thick line (L shape) and C2 thick line (inverted L shape) even in FIG. 5B, there are included, for example, a pattern wherein the two pixels on the left side are C1 and the pixels on the right side are C2 and a pattern wherein a color other than C1 and C2 is present in the two pixels on the lower side.

Referring back to FIG. 2, if it is determined in S103 that the 2×2 block is sorted to a thin line (checks), the processing flow advances to S104, in which a division is made to corresponding cases in accordance with the number of pixels (hereinafter referred to as C1 pixel number) of the target color C1 and the number of pixels (C2 pixel number hereinafter) of the target color C2 in the 2×2 block. When the C1 pixel number is the larger (i.e., C1 pixel number=2, C2 pixel number=1), it is determined that the line of the target color C1 is present, and in S107 there is made sorting to the C1 thick line (L shape). When the C2 pixel number is the larger (i.e., C2 pixel number=2, C1 pixel number=1), it is determined that the line of the target color C2 is present, and in S108 there is made sorting to the C2 thick line (inverted L shape). If sorting is made to the C1 or C2 thick line, the processing flow advances to S109. The processing of S109 will be described later.

When the C1 pixel number and the C2 pixel number are equal to each other (i.e., C2 pixel number=2, C1 pixel number=2) in S104, the processing flow further advances to S105 and S106, in which there is performed a determination processing. In S105, there are counted both C1 pixel number and C2 pixel number in a 4×4 pixel block containing a 2×2 block centrally. Then, in S106, the C1 pixel number and the C2 pixel number are compared with respective predetermined values. In the illustrated example, 6 is shown as a concrete example of each of the predetermined values. That is, it is determined whether C1 pixel number≤6 and C2 pixel number≤6. If C1 pixel number≤6, it is determined that the line of the target color C1 is present, and in S107 there is made sorting to the C1 thick line (L shape). Likewise, if C2 pixel number≤6 in S106, it is determined that the line of the target color C2 is present, and in S108 there is made sorting to the C2 thick line (inverted L shape). If sorting is made to the C1 and C2 thick lines, the processing flow advances to S109. Of course, the predetermined number is not limited to 6.

If sorting is made to neither the C1 thick line nor the C2 thick line in S106, the processing for improving the image quality is not performed, but the processing for the block concerned is ended and the processing flow advances to S112, in which shift is made to processing for the next block.

If sorting is made to the C1 and C2 thick lines in S103 and if sorting is made to the C1 thick line in S107 and the C2 thick line in S108, a dot direction (horizontal or vertical) in the original image is roughly calculated using a method for the C1 or C2 thick line and an angle is calculated exactly from a connection length. Further, in S110, pixels are outputted to corresponding positions in the original image having been doubly enlarged on the basis of the dot direction and angle obtained in S109 and in accordance with an area occupancy of an edge obtained from the exactly calculated angle.

It is determined in S111 whether all of 2×2 blocks have been extracted and processed, and if there remains any 2×2 block not processed yet, the processing flow returns to S101 to process the unprocessed 2×2 block. When the processing for all the 2×2 blocks is over, the processing in the image processing section 3 is ended.

Figure 6:
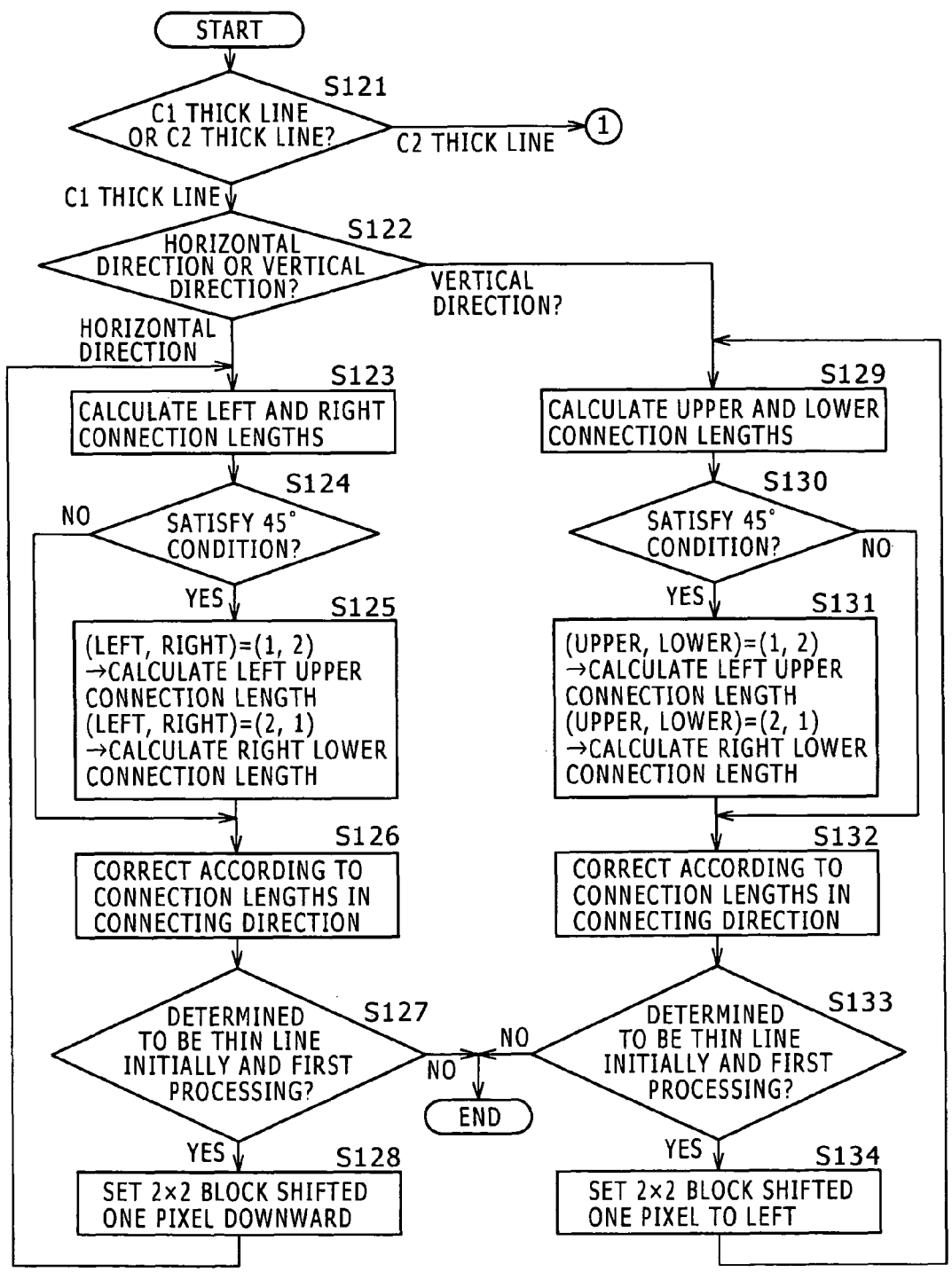
FIG. 6 is a flowchart showing an example of processing performed by an image quality improving unit 14 in the image processing unit 3.
Figure 7:
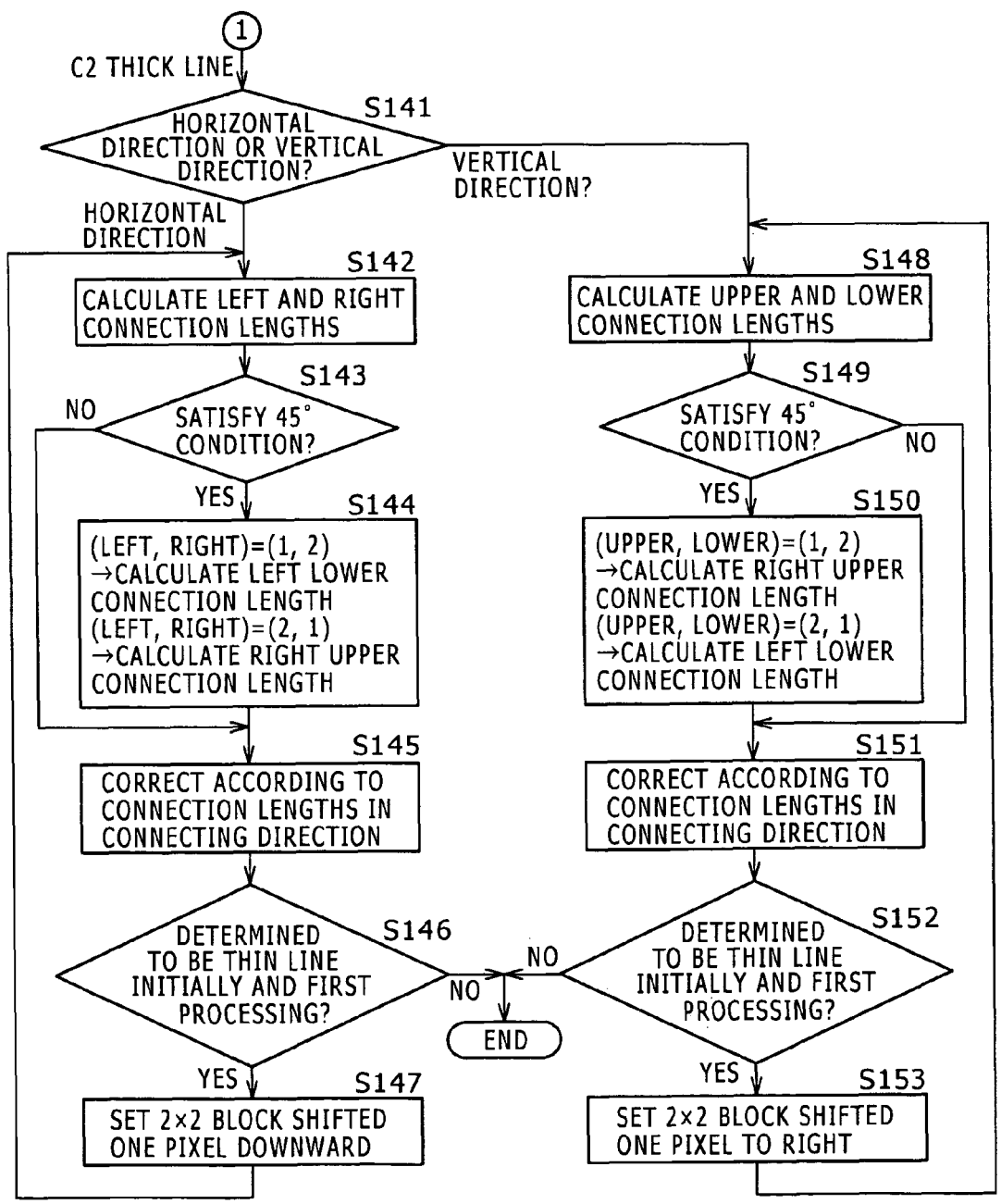
FIG. 7 is a flowchart showing an example of processing (continued from FIG. 6) performed by the image quality improving unit 14 in the image processing section 3.

The processings of S109 and S110 in FIG. 2 will now be described in more detail. FIGS. 6 and 7 are flowcharts showing an example of processing performed by the image quality improving unit 14 in the image processing section 3. This processing corresponds to S109 and S110 in FIG. 2. First, in S121, it is determined whether the 2×2 block has been sorted to the C1 thick line or the C2 thick line. For example, if it is determined in S103 and S107 in FIG. 2 that the 2×2 block is the C1 thick line, the processing flow advances to S122. On the other hand, if it is determined in S103 and S108 that the 2×2 block is the C2 thick line, the processing flow advances to S141 in FIG. 7.

If the 2×2 block is sorted to the C1 thick line, it is determined in S122 whether an edge of the C1 thick line extends in a horizontal direction or in a vertical direction, by rough calculation in the rough angle calculation part 21. If the edge extends in a horizontal direction, the processing flow advances to S123 to calculate right and left connection lengths, while if the edge extends in a vertical direction, the processing flow advances to S129 to calculate upper and lower connection lengths.

Figure 8:
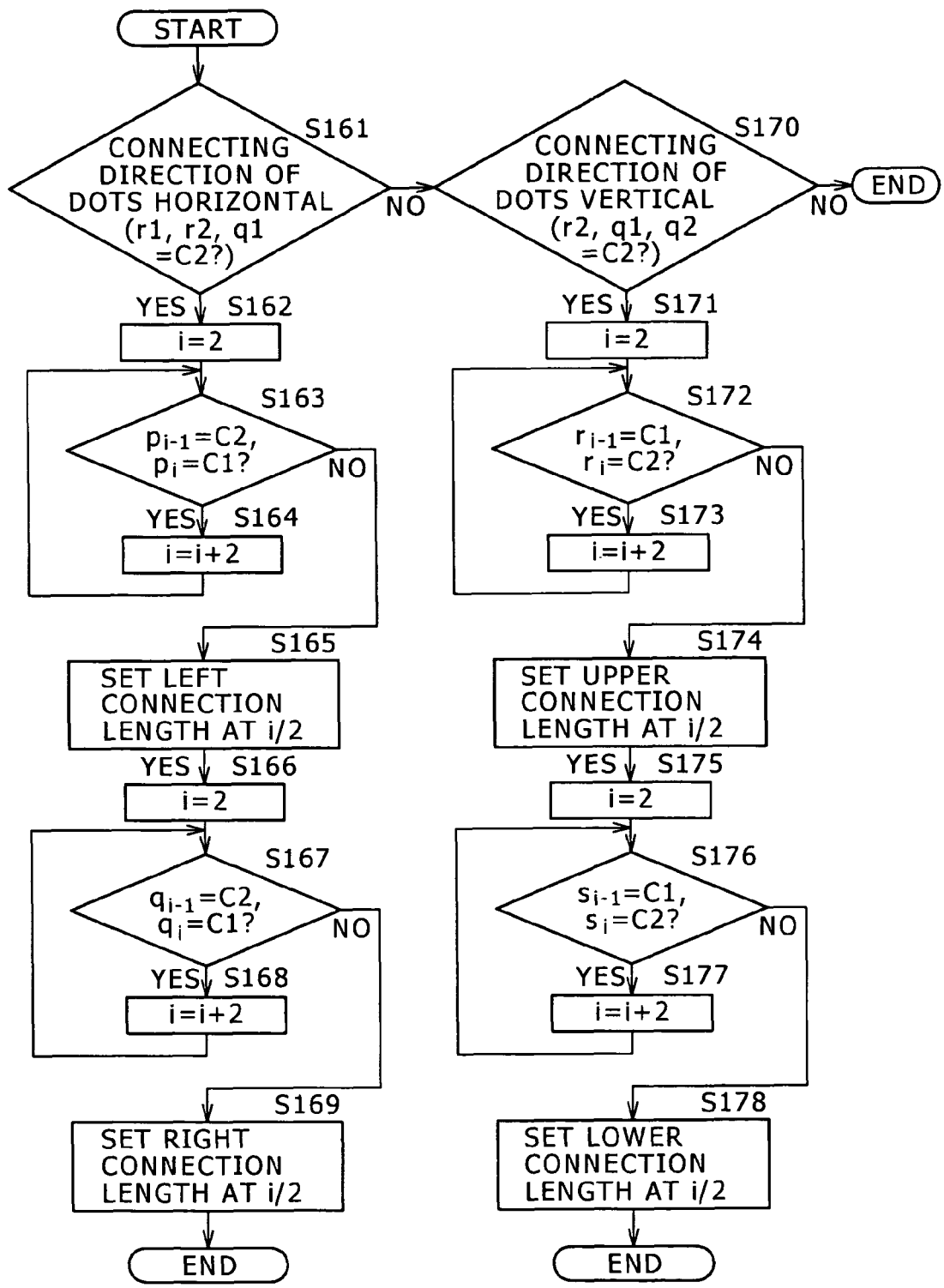
FIG. 8 is a flowchart showing an example of a processing for extracting a connecting direction (rough angle) and connection lengths (exact angles) of a 2×2 block sorted to a C1 thick line in the image processing section.

FIG. 8 is a flowchart showing an example of a processing for extracting a connecting direction (rough angle) and connection lengths (exact angles) of the 2×2 block sorted to the C1 thick line in the image processing section 3, FIG. 9A to 9F are diagrams showing an example of a rough angle calculation process for the 2×2 block sorted to the C1 thick line, and FIGS. 10A to 10K are explanatory diagrams showing a concrete example of a processing for extracting a connecting direction and connection lengths and a pixel correction processing. The processings of S122, S123 and S129 in FIG. 7 are shown in FIG. 8.

Figure 9:
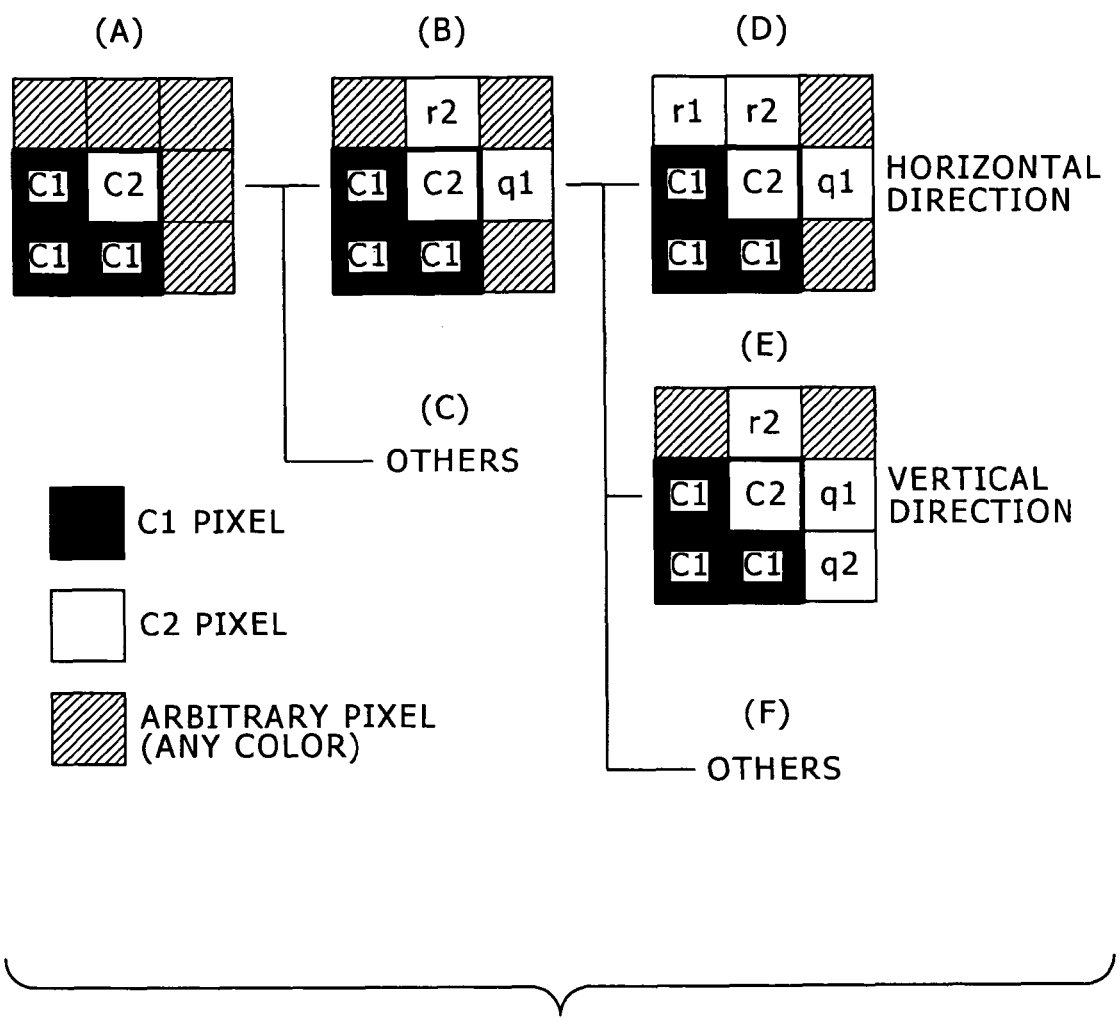
FIGS. 9A to 9F are diagrams showing an example of a rough angle calculation processing for the 2×2 block sorted to the C1 thick line.

When determining in S122 in FIG. 7 whether an edge of the C1 thick line extends in a horizontal direction or in a vertical direction, reference is made to pixel values of a 3×3 pixel size block including hatched pixels and 2×2 block in FIG. 9A. Then, in S161 and S170 in FIG. 8, a dot connecting direction (horizontal or vertical) is determined. This is a processing of roughly calculating the angle of the edge concerned. For example, if two pixels ($r_1$ and $r_2$ in FIG. 9D) lying above the 2×2 block and the pixel ($q_1$ in FIG. 9D) lying on the right upper side of the 2×2 block are pixels of the target color C2 as in FIG. 9D for example, it can be estimated that the edge extends in a horizontal direction. In this case, the processing flow shifts from S161 to S162. If two pixels ($q_1$ and $q_2$ in FIG. 9E) lying on the right side of the 2×2 block and the pixel ($r_2$ in FIG. 9E) lying on the upper right side of the 2×2 block are pixels of the target color C2, it can be estimated that the edge in question extends in a vertical direction. In this case, the processing flow shifts from S170 to S171. Unless both conditions are satisfied, the processing for the 2×2 block concerned is ended.

In the determination processing performed in S161 and S170, as shown in FIG. 9B, first a check is made to see whether the right pixel ($r_2$ in FIG. 9B) out of the two pixels lying above the 2×2 block and the upper pixel ($q_1$ in FIG. 9B) out of the two pixels lying on the right side of the 2×2 block are pixels of the target color C2. In the case where both pixels are of the target color C2, it may be determined that the connecting direction is a horizontal direction if the pixel $r_1$ is of the target color C2 as in FIG. 9D and it may be determined that the connecting direction is a vertical direction if the pixel $q_2$ is of the target color C2 as in FIG. 9E. According to the flowchart shown in FIG. 8, it is first determined in S161 whether the connecting direction is a horizontal direction or not and then in S170 it is determined whether the connecting direction is a vertical direction or not. However, the determination may be made vice versa.

Figure 10:
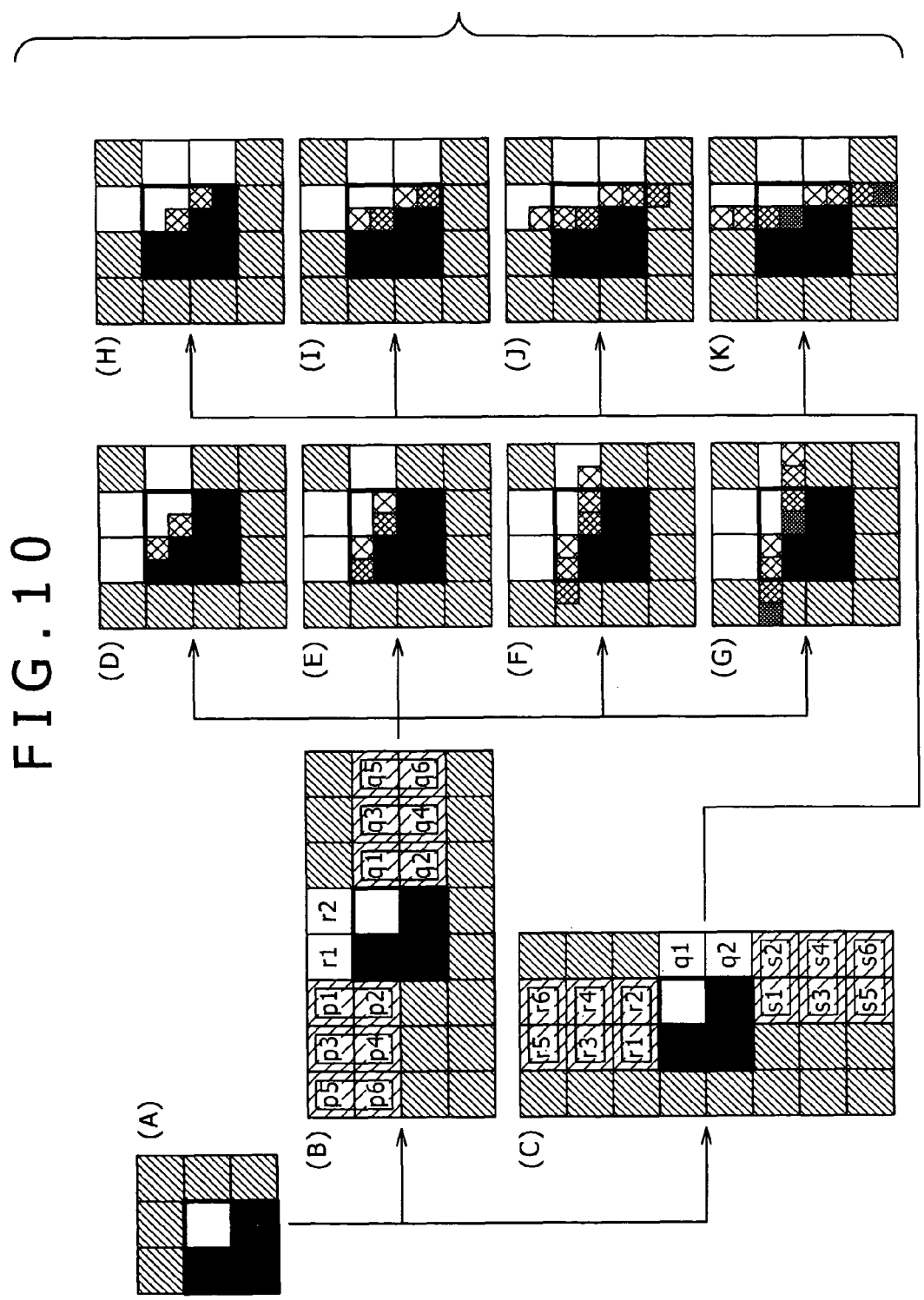
FIGS. 10A to 10K are explanatory diagrams showing a concrete example of a processing for extracting a connecting direction and connection lengths and a pixel correction processing for the 2×2 block sorted to the C1 thick line.

Next, for example when the connecting direction is a horizontal direction, dot connection lengths are calculated on both right and left sides. For example, as shown in FIG. 10B, $p_1, p_2, \ldots$ are set on the left upper side of the 2×2 block. On the right side of the 2×2 block are set $q_3, q_4, \ldots$, including the foregoing $q_1$ and $q_2$. In S162 in FIG. 8 the variable i is set at 2 to initialize and it is determined in S163 whether $p_{i-1}=C2$, $p_i=C1$ or not. If the answer is affirmative, 2 is added to i in S164, followed by return to S163, in which the determination is repeated with respect to two leftwards adjacent pixels. In this way the pair of $p_{i-1}=C2$ and $p_i=C1$ which are continuous horizontally on the left upper side of the 2×2 block is counted by the variable i and in S165 the variable i is divided by 2 to obtain a left connection length.

Further, in S166, the variable i is set at 2 to initialize, then in S167 it is determined whether $q_{i-1}=C2$ and $q_i=C1$. If the answer is affirmative, 2 is added to i in S168, followed by return to S167, in which the determination is repeated with respect to two rightwards adjacent pixels. In this way the pair of $q_{i-1}$=C2 and $q_i$=C1 which are continuous horizontally on the right side of the 2×2 block is counted by the variable i and in S169 the variable i is divided by 2 to obtain a right connection length.

In this way there are determined connection lengths in both right and left directions. Thereafter, the processing flow advances to S24 in FIG. 6. Although in FIG. 10B there are shown only up to $p_6$ and $q_6$, counting may be continued as long as there is continuity, or may be stopped at a certain position.

Likewise, if the connecting direction is a vertical direction, the dot connection length is calculated in each of up and down directions. For example, as shown in FIG. 10C, $r_3$, $r_4$, . . . , including $r_1$ and $r_2$ described above, are set above the 2×2 block, and $s_1$, $s_2$, . . . are set on the right lower side of the 2×2 block. In S171 in FIG. 8 the variable i is set at 2 to initialize and in S172 it is determined whether $r_{i-1}$=C1 and $r_1$=C2. If the answer is affirmative, 2 is added to i in S173, followed by return to S172, in which the determination is repeated for the two pixels adjacent on the upper side. In this way the pair of $r_{i-1}$=C1 and $r_i$=C2 which are adjacent on the upper side is counted from the variable i, and in S174 the variable i is divided by 2 to obtain an upper connection length.

Further, in S175 the variable i is set at 2 to initialize and in S176 it is determined whether $s_{i-1}$=C1 and $s_i$=C2. If the answer is affirmative, 2 is added to in S177, followed by return to S176, in which the determination is repeated for the two pixels adjacent on the right lower side. In this way the pair of $s_{i-1}$=C1 and $s_i$=C2 which are continuous in a vertical direction on the right lower side of the 2×2 block is counted and in S178 the variable i is set at a half to obtain a lower connection length.

In this way there are obtained connection lengths in both up and down directions. Thereafter, the processing flow advances to S130 in FIG. 6. Although in FIG. 10C there are shown only up to $r_6$ and $s_6$, the counting may be continued also in the case of a vertical direction as long as there is continuity, or may be stopped at a certain position.

Referring back to FIG. 6, after it is determined in S122 that the connecting direction is a horizontal direction and after the connection lengths are calculated in S123, it is determined in S124 whether the connecting direction satisfies the condition of 45°. If the answer is affirmative, the processing flow advances to S125, in which the angle in the connecting direction is calculated exactly by the exact angle calculation part 22. When the edge direction is near 45°, with mere connection lengths, the angle in 45° direction cannot be obtained with high accuracy, so there sometimes is a case where a satisfactory image improving effect is not obtained. Therefore, when the edge direction is near 45°, there is performed an exact angle calculation process to obtain the angle with high accuracy.

FIGS. 11A to 11D are explanatory diagrams showing an example of an exact angle calculation in a 45° direction in the case where the 2×2 block is the C1 thick line and the connecting direction is a horizontal direction. For example, the 45° condition in S124 can be determined by extracting the case where the connection length is short. For example, it can be determined that the connecting direction is the 45° direction in the case of left connection length=2 and right connection length=1 shown in FIG. 11A or in the case of left connection length=1 and right connection length=2 shown in FIG. 11B.

In other cases it is determined that the connecting direction is not the 45° direction, and the processing flow advances to S126.

If the connecting direction satisfies the 45° condition in S124, the processing flow advances to S125, in which, if left connection length=2 and right connection length=1, reference is made to 2-pixel pairs adjacent right and left in the right lower direction as coarsely hatched in FIG. 11C to calculate a connection length. How to calculate the connection length is the same as that in horizontal and vertical directions and therefore the details thereof are here omitted. But in this example the connection length is the length of continuance of such pair as the left and right pixels being C1 and C2 respectively out of 2-pixel pairs arranged right and left. Likewise, if left connection length=1 and right connection length=2, reference is made to 2-pixel pairs adjacent right and left in the left upper direction as coarsely hatched in FIG. 11D to calculate a connection length. Also in this case, the connection length is the length of continuance of such pair as the left and right pixels being C1 and C2 respectively out of 2-pixel pairs arranged right and left. Thus, connection lengths are calculated in two directions which are right and left directions in the case of a horizontal direction and are up and down directions in the case of a horizontal direction. However, when the 45° condition is satisfied, there is calculated a connection length in one predetermined direction (either the right lower side or the left upper side). After calculation of the connection lengths in the 45° direction in the above manner, the processing flow advances to S126.

On the other hand, if it is determined that the connecting direction is a vertical direction in S122, then after calculation of connection lengths in S129, it is determined in S130 whether the connecting direction satisfies 45° condition or not. If the answer is affirmative, the processing flow advances to S131, in which the angle in the connecting direction is calculated exactly by the exact angle calculation part 22.

FIG. 12 is an explanatory diagram showing an example of an exact angle calculation in 45° direction in the case where the 2×2 block is the C1 thick line and the connecting direction is a vertical direction. For example, the 45° condition in S130 can be determined by extracting the case where the connection length is short. For example, in the case of upper connection length=2 and lower connection length=1 shown in FIG. 12A or upper connection length=1 and lower connection length=2 shown in FIG. 12B, it can be determined that the connecting direction is 45° direction. In other cases it is determined that the connecting direction is not 45° direction, and the processing flow advances to S132.

If the connecting direction satisfies the 45° condition in S130, the processing flow advances to S131, in which, if upper connection length=2 and lower connection length=1, reference is made to 2-pixel pairs adjacent up and down in the right lower direction as coarsely hatched in FIG. 12C and, in this case, a connection length is again calculated from the length of vertical continuance of pairs of reference color C2 and reference color C1. The reference to the 2-pixel pair starts with the second pixel counted from the pair in the 2×2 block of the original image corresponding to the starting position of dot correction. Likewise, if upper connection length=1 and lower connection length=2, reference is made to 2-pixel pairs adjacent up and down in the left upper direction as coarsely hatched in FIG. 12D and, also in this case, a connection length is calculated from the length of vertical continuance of pairs of reference color C2 and reference color C1. After calculation of the connection length in 45° direction in the above manner, the processing flow advances to S132.

Next, the following description is provided about the processing performed in S126 and S132. At this stage, since connection lengths in the horizontal, vertical or 45° direction have been extracted, corrected pixel values are outputted in accordance with corresponding exact angles. In this example, since the image quality is to be improved by the antialiasing-enlarging process, values after processing are outputted into the original image which is enlarged double beforehand. If the connecting direction is a horizontal direction, pixel values proportional to connection lengths are distributed within the doubled original image in the horizontal direction as the connecting direction for example as shown in FIGS. 10D to 10G. For example, if the connection length in the left direction is k, pixel values corresponding to k-pixel length are outputted. Also in the right direction, the same pixel layout may be adopted.

In FIGS. 10D to 10G there are shown examples of layouts in the case where right and left connection lengths are the same. For example, FIGS. 10D, 10E, 10F, and 10G, show cases of connection lengths of 1, 2, 3, and 4, respectively. When right and left connection lengths are different, for example when the connection length in the left direction is 2 and the connection length in the right direction is 4, a total of six dots, i.e., two dots arranged in the left direction on the left side in FIG. 10E and four dots arranged in the right direction on the right side in FIG. 10G, may be arranged in corresponding positions.

When the connecting direction is a vertical direction, for example as shown in FIGS. 10H to 10K, pixel values proportional to connection lengths are distributed within the doubled original image in the vertical direction as the connecting direction. For example, in the case of a connection length of k, pixel values corresponding to k-pixel length may be outputted. In FIGS. 10H to 10K there are shown examples of dot layouts assuming that the upper and lower connection lengths are the same. FIGS. 10H, 10I, 10J, and 10K, show cases of connection lengths of 1, 2, 3, and 4, respectively. In the case where upper and lower connection lengths are different, dots proportional respectively to connection lengths in upward and downward directions may be arranged in corresponding positions.

Figure 13:
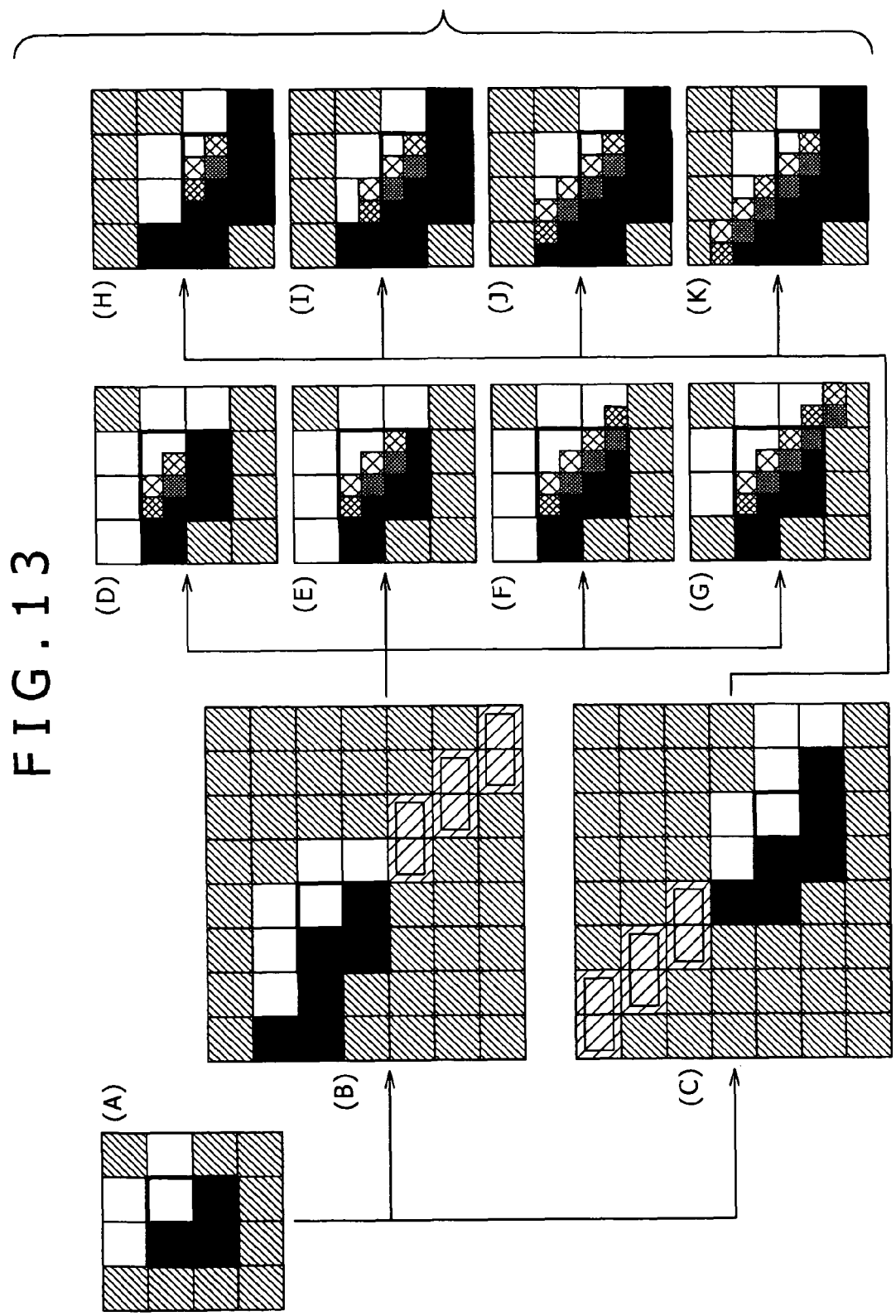
FIGS. 13A to 13K are explanatory diagrams showing an example of an image quality improving process performed when it is determined that the 2×2 block is the C1 thick line and the connecting direction is a horizontal 45° direction.

Also when the connecting direction is 45° direction, dots may be arranged in the same way as in the cases of horizontal and vertical directions. FIGS. 13A to 13K are explanatory diagrams showing an example of processing performed when it is determined that the 2×2 block is the C1 thick line and the connecting direction is a horizontal 45° direction. In the case where the 45° condition is satisfied in S124 and the connection length in 45° direction is calculated in S125, pixel values are distributed in the right lower or left upper direction corresponding to the horizontal direction in S126, as shown in FIG. 13.

When the connection length is counted in the right lower direction in S125 as described above in connection with FIG. 11C (FIG. 13B), pixel values are distributed as shown in FIGS. 13D to 13G. When the connection length is counted in the left upper direction in S125 as described above in connection with FIG. 11D (FIG. 13C), pixel values are distributed as shown in FIGS. 13H to 13K.

Figure 14:
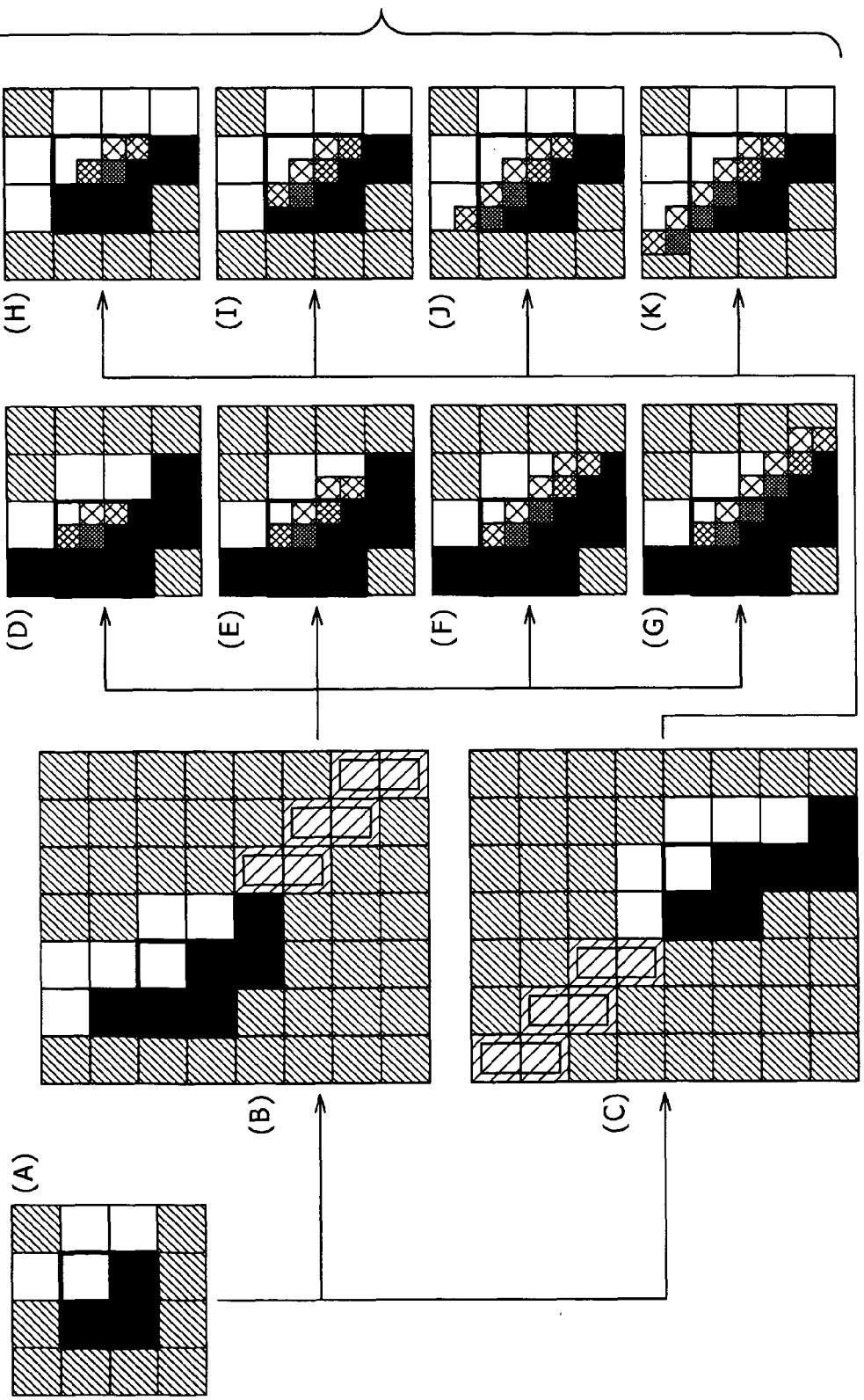
FIGS. 14A to 14K are explanatory diagrams showing an example of an image quality improving process performed when the 2×2 block is the C1 thick line and the connecting direction is a vertical 45° direction.
Figure 17:
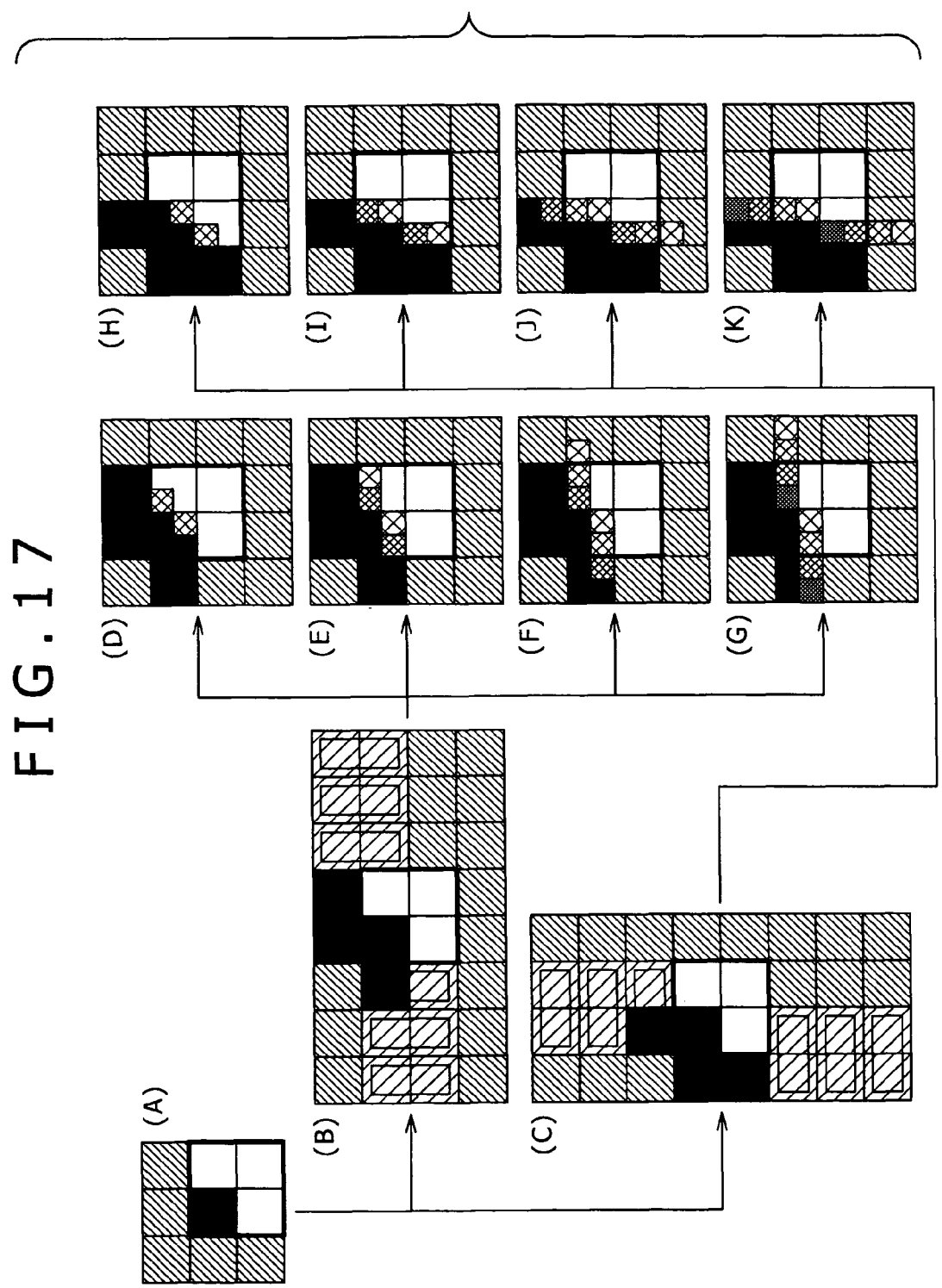
FIGS. 17A to 17K are explanatory diagrams showing a concrete example of a processing for extracting a connecting direction and connection lengths and an image quality improving process for the block sorted to the C2 thick line in the image processing section 3.

FIG. 14 is an explanatory diagram showing an example of processing performed when it is determined that the 2×2 block is the C1 thick line and the connecting direction is a vertical 45° direction. When the 45° condition is satisfied in S130 and the connection length in the 45° direction is calculated in S131, pixel values are distributed in the right lower or left upper direction corresponding to the vertical direction in S132, as shown in FIG. 14.

In the case where the connection length is counted in the right lower direction in S131 as described above in connection with FIG. 12C (FIG. 14B), pixel values are distributed as shown in FIGS. 14D to 14G. In the case where the connection length is counted in the left upper direction in S131 as described above in connection with FIG. 12D (FIG. 14C, pixel values are distributed as shown in FIGS. 14H to 14K.

For example, if the connection length is k, the distribution of pixel values can be done by outputting pixel values of 2-dot pairs corresponding to k-pixel length. As to concrete pixel values to be distributed, a description will be given later also with respect to the cases of both horizontal and vertical directions, including the case of 45° direction. In the above examples, for the sake of convenience, processing is performed in S126 when the connecting direction is a horizontal direction and processing is performed in S132 when the connecting direction is a vertical direction, but the processings may be made common to each other.

The processings for the improvement of image quality in S126 and S132 have thus been performed in connection with the case of the C1 thick line. Next, the processing flow advances to S127 and S133, in which it is determined whether the processed 2×2 block has been determined to be the C1 thick line in S106 or S104 in FIG. 2. If the 2×2 block has been determined to be the C1 thick line in S104 (that is, if it has been sorted to the C1 thick line from the beginning), the processing is ended.

If the 2×2 block has been determined to be the C1 thick line in S106 and processed as the C1 thick line (that is, if it is sorted to a thin line at the beginning and thereafter has been sorted to the C1 thick line) and if the processing is the first processing, the processing flow advances to S128 and S134 in FIG. 6, in which the position of the target 2×2 block is shifted by one pixel in a predetermined direction and processing is performed again.

FIG. 15 is an explanatory diagram of a block position established at the time of performing the second C1 thick line processing in the case of the block pattern concerned being sorted to the C1 thick line after being determined to be a thin line. For example, in the case where the block pattern concerned is sorted to the C1 thick line after being determined to be a thin line and the connecting direction is a horizontal direction, 2×2 pixels located at a position shifted by one pixel downward are regarded as a block to be processed, as shown in FIG. 15A, followed by return to S123 to repeat the C1 thick line processing in the horizontal direction.

The processing of S126 involves pixel layout for a portion where C2 and C1 edges are present on upper and lower sides, respectively. This processing premises that the lower portion is C1 because it is assumed that the block pattern is the C1 thick line. Therefore, for example as shown in FIGS. 10D to 10G and FIGS. 13A to 13K, pixels are arranged on only the upper side of the 2×2 block concerned. In the case of a thin line, however, not only the C2 and C1 edges are present on upper and lower sides, respectively, but the also C1 and C2 edges are present on upper and lower sides, respectively, with respect to the 2×2 block. Therefore, by only the processing for the upper edge, the image quality improving process is not performed for the lower edge. For preventing such an omission of the processing, a 2×2 block shifted by one pixel downward relative to the 2×2 block in question, (the inner square 2×2 block), is made a block to be processed, as shown in FIG. 15A. Since this one pixel down-shifted 2×2 block is a C1-C2 exchanged block with respect to the pattern of the C1 thick line, the processing to be performed is a C1-C2 exchanged processing in connection with the above processing of the C1 thick line. In this way the correction of pixel values can be done also for the lower edge in a thin line.

Likewise, for example when the block pattern concerned is sorted to the C1 thick line after being determined to be a thin line and the connecting direction is a vertical direction, 2×2 pixels located at a position shifted leftwards by one pixel are regarded as a block to be processed in S134, as shown in FIG. 15B, and the processing flow again returns to S129, in which the C1 thick line processing in the vertical direction is repeated.

The processing in S132 involves layout of pixels for a portion where C2 and C1 edges are present on right and left sides, respectively. This processing premises that C1 pixels as inner pixels are present on the left portion because it is assumed that the block pattern is the C1 thick line. Therefore, for example as shown in FIG. 10H to 10K and FIG. 14, pixels are arranged on only the right side of the 2×2 block concerned. However, in the case of a thin line, not only the C2 and C1 edges are present on right and left sides, respectively, but also the C1 and C2 edges are present on right and left sides, respectively, with respect to the 2×2 block. Therefore, by only the processing for the right edge, the image quality improving process is not performed for the left edge. For preventing such an omission of the processing, a 2×2 block shifted by one pixel leftwards relative to the 2×2 block in question (the inner square 2×2 block) is made a block to be processed, as shown in FIG. 15B. Since this one pixel leftward-shifted 2×2 block is a C1-C2 exchanged block with respect to the pattern of the C1 thick line, the processing to be performed is a C1-C2 exchanged processing in connection with the above processing of the C1 thick line. In this way the correction of pixel values can be done also for the left edge in a thin line.

When the processing for the 2×2 block shifted downwards or leftwards by one pixel is over, the processings of S127 and S133 are ended without further shift of the block. In this way all of the processings for 2×2 blocks sorted to the C1 thin line including the case where the block pattern concerned is sorted to the C1 thick line after sorted to checks (thin line).

The processing for 2×2 blocks sorted to the C2 thick line is the same as is the case with the C1 thick line. In S141 in FIG. 7 it is determined by the rough angle calculation part 21 whether the edge of the C2 thick line extends in a horizontal direction or in a vertical direction. Also in the case of the C2 thick line, as is the case with the above the C1 thick line, it is determined that the edge extends in a horizontal direction for example if two upper pixels of 2×2 pixels and one left pixel thereabove, i.e., a total of three pixels, are C1 and it is determined that the edge extends in a vertical direction if two left pixels of 2×2 pixels and one left pixel thereabove, i.e., a total of three pixels, are C1. If the edge extends in a horizontal direction, the processing flow advances to S142 to count right and left connection lengths, while if the edge extends in a vertical direction, the processing flow advances to S148 to count upper and lower connection lengths.

FIGS. 16A to 16F are diagrams showing an example of a rough angle calculation process for a 2×2 block sorted to the C2 thick line and FIGS. 17A to 17K are explanatory diagrams showing a concrete example of an extraction processing of a connecting direction and connection lengths and an image quality improving process for the block sorted to the C2 thick line in the image processing section 3. The horizontal/vertical direction determination is performed in the same manner as in the case of the C1 thick line. As shown in FIG. 16B, a check is first made to see whether or not the pixel located on the left side of the upper portion of the 2×2 block and the pixel located on the upper side of the left portion of the same block are both C1 pixels, and if the answer is affirmative, it is determined whether or not the pixel located on the upper side of the right portion of the 2×2 block is C1 or whether or not the pixel located on the left side of the lower portion of the same block is C1, as shown in FIGS. 16D and 16E, whereby it is possible to determine whether the edge direction is a horizontal direction or a vertical direction. Then, C2-C1 pairs are counted in S143 with respect to two pixels as one set which are roughly hatched in FIG. 17B if the edge direction is a horizontal direction and are counted in S148 with respect to two pixels as one set which are roughly hatched in FIG. 17C if the edge direction is a vertical direction, to determine respective connection lengths.

Further, the determination of the 45° direction is performed from the connection lengths thus obtained. In the case of a horizontal direction, it is determined in S143 whether or not the 45° condition, e.g., left connection length=1, right connection length=2, or left connection length=2, right connection length=1, is satisfied. If the answer is affirmative, it is regarded that the connecting direction is the 45° direction. In other cases, it is determined that the connecting direction is not 45° direction, and the processing flow advances to S145 for the improvement of image quality.

FIG. 18 is an explanatory diagram showing an example of an exact angle calculation in the 45° direction in the case where the 2×2 block is the C2 thick line and the connecting direction is a horizontal direction. If the connecting direction meets the 45° condition in S143, the processing flow advances to S144, in which, if left connection length=2 and right connection length=1 as in FIG. 18A, reference is made to pairs of two pixels adjacent right and left which pairs are arranged in the right upper direction as roughly hatched in FIG. 18C to calculate a connection length. In this example, the length of continuance of such pairs as left pixels being C1 and right pixels C2 out of right and left two-pixel pairs becomes a connection length. Reference to such 2-pixel pairs starts with the second pixel counted from the pair in the 2×2 block of the original image corresponding to the position in which the correction of dot is started.

Likewise, if left connection length=1 and right connection length=2 as shown in FIG. 18B, reference is made to pairs of two right and left adjacent pixels in the left lower direction which are coarsely hatched in FIG. 18D to calculate a connection length. Also in this case, the length of continuance of such pairs as left pixels being C1 and right pixels C2 out of right and left two-pixel pairs becomes a connection length. As is the case with the C1 thick line, when the 45° condition is met, there is calculated a connection length in one predetermined direction (in this case, only one of the right upper and left lower sides). After calculation of the connection length in the 45° direction in the above manner, the processing flow advances to S145.

On the other hand, after the connecting direction is determined to be a vertical direction in S141 and connection lengths calculated in S148, it is determined in S149 whether the connecting direction satisfies the 45° condition or not. If the answer is affirmative, the processing flow advances to S150, in which the angle in the connecting direction is calculated exactly by the exact angle calculation part 22.

FIG. 19 is an explanatory diagram showing an example of an exact angle calculation in 45° direction in the case where the 2×2 block is the C2 thick line and the connecting direction is a vertical direction. For example, the 45° condition in S149 can be determined by extracting the case where the connection length is short. For example, in the case of upper connection length=2 and lower connection length=1 shown in FIG. 19A or upper connection length=1 and lower connection length=2 shown in FIG. 19B, it can be determined that the connecting direction is the 45° direction. In other cases it is determined that the connecting direction is not the 45° direction, and the processing flow advances to S151.

When the connecting direction satisfies the 45° condition in S149, the processing flow advances to S150, in which, if upper connection length=2 and lower connection length=1, reference is made to pairs of vertically adjacent two pixels which pairs are coarsely hatched in FIG. 19C and arranged in the left lower direction. In this case, a connection length is again calculated from the length of vertical continuance of C1-C2 pairs. Likewise, if upper connection length=1 and lower connection length=2, reference is made to pairs of vertically adjacent two pixels which pairs are coarsely hatched in FIG. 19D and arranged in the right upper direction. Also in this case, a connection length is again calculated from the length of vertical continuance of C1-C2 pairs. After calculation of the connection length in the 45° direction in the above manner, the processing flow advances to S151.

Next, a description will be given about the processing performed in S145 and S151. At this stage, since connection lengths in horizontal, vertical or 45° direction have been extracted, corrected pixel values are outputted in accordance with corresponding exact angles. In this example, since the image quality is to be improved by the antialiasing-enlarging process, values after processing are outputted into the original image which is enlarged double beforehand. If the connecting direction is a horizontal direction, pixel values proportional to connection lengths are distributed within the doubled original image in the horizontal direction as the connecting direction for example as shown in FIGS. 17D to 17G. When the connecting direction is a vertical direction, for example as shown in FIG. 17H to 17K, pixel values proportional to connection lengths are distributed in the doubled original image in the vertical direction as the connecting direction.

Figure 20:
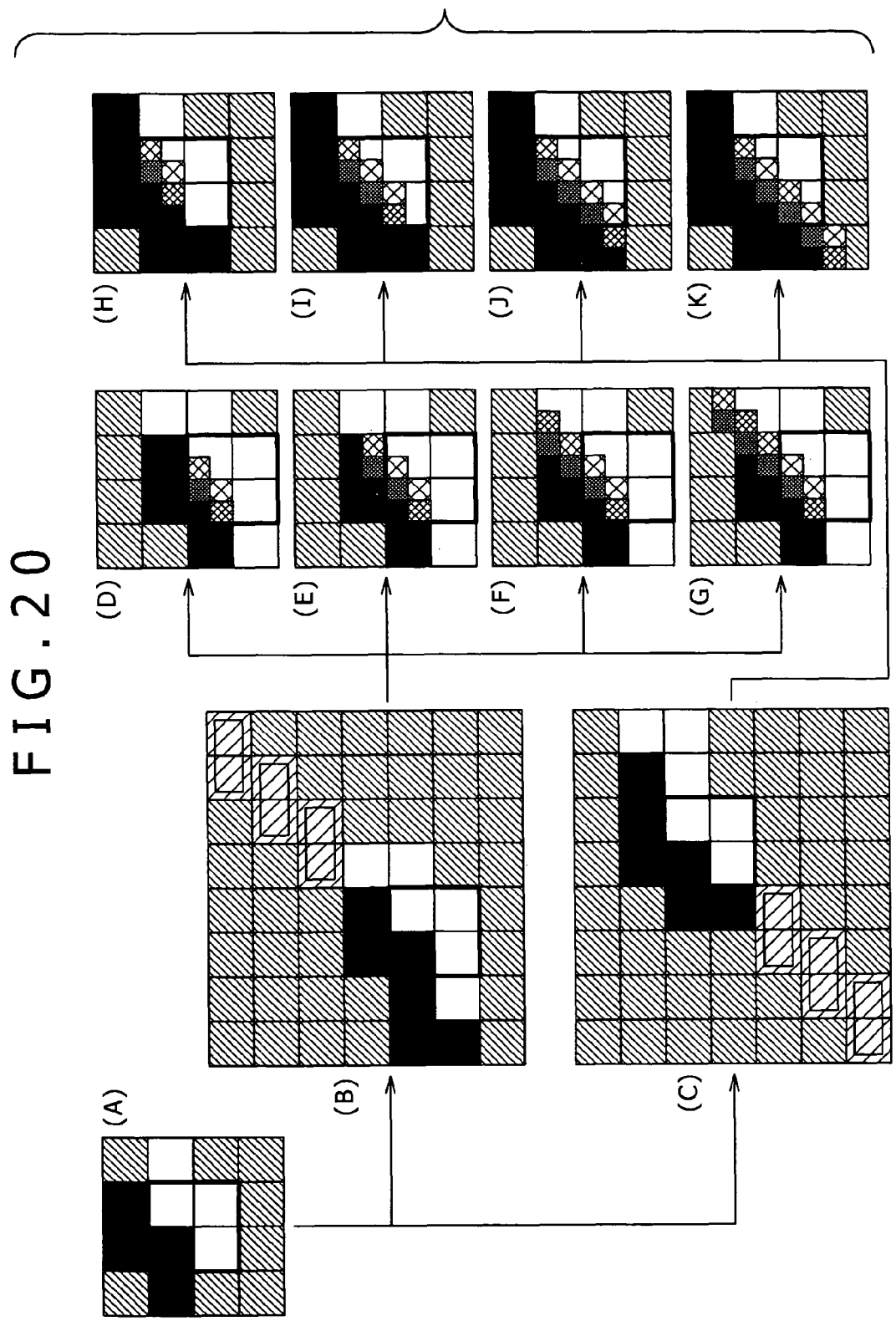
FIGS. 20A to 20K are explanatory diagrams showing an example of an image quality improving process performed when it is determined that the 2×2 block is the C2 thick line and the connecting direction is a horizontal 45° direction.

Also when the connecting direction is the 45° direction, it is possible to effect the layout of dots. FIGS. 20A to 20K are explanatory diagrams showing an example of processing performed when it is determined that the 2×2 block is the C2 thick line and the connecting direction is a horizontal 45° direction, and FIGS. 21A to 21K are explanatory diagrams showing an example of processing performed when the 2×2 block is the C2 thick line and the connecting direction is a vertical 45° direction. When the 45° condition is satisfied in S143 and a connection length in a 45° right upper direction is calculated in S144 as shown in FIG. 20B, pixel values are distributed in the right upper direction in S145 as shown in FIGS. 20D to 20G. When the 45° condition is satisfied in S143 and a connection length in 45° left lower direction in S144 as shown in FIG. 20C, pixel values are distributed in the left lower direction in S145 as shown in FIGS. 20H to 20K.

Figure 21:
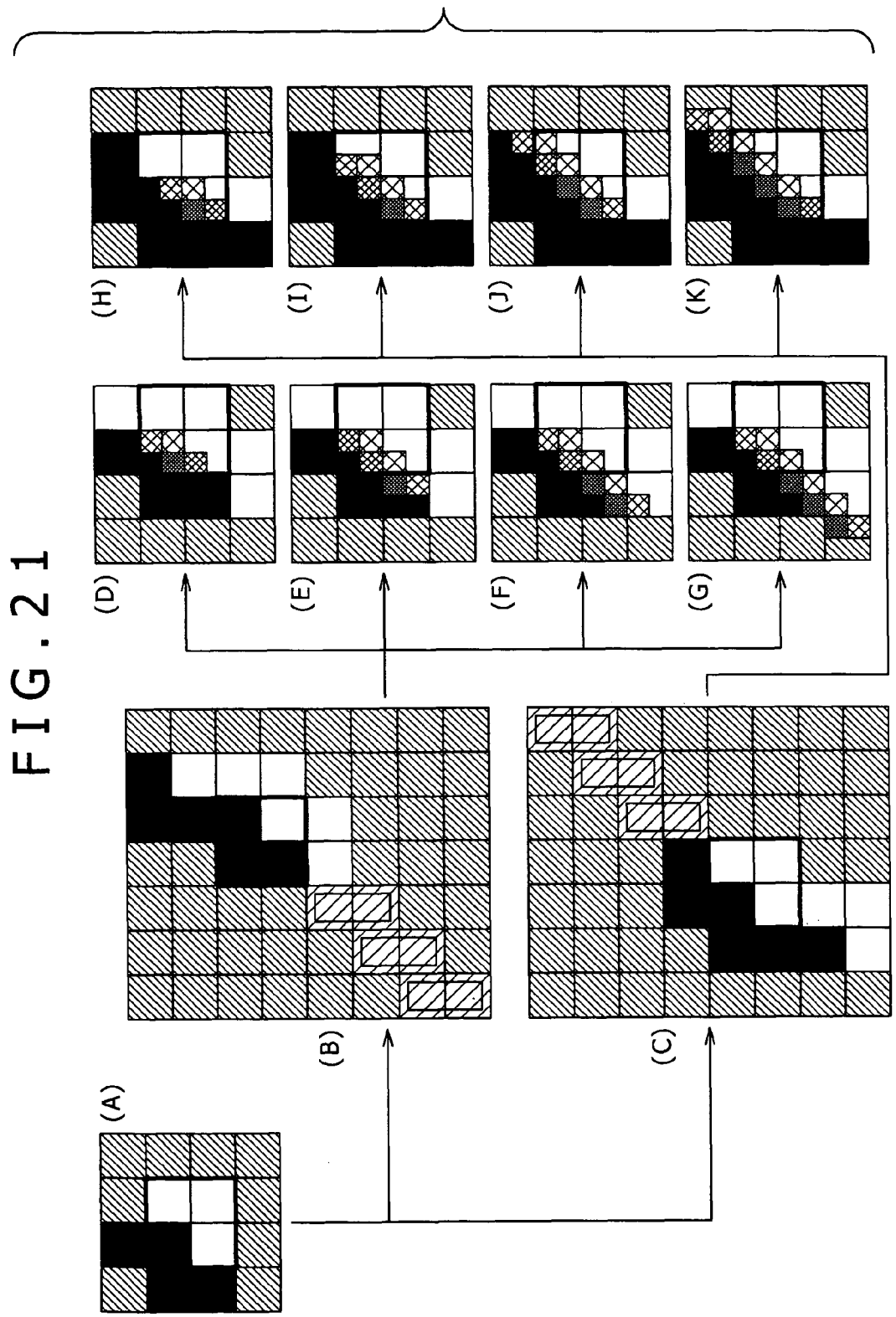
FIGS. 21A to 21K are explanatory diagrams showing an example of an image quality improving process performed when it is determined that the 2×2 block is the C2 thick line and the connecting direction is a vertical 45° direction.

Further, when the connecting direction is a vertical direction and the 45° condition is satisfied in S149 and when a connection length in a 45° left lower direction in S150 as shown in FIG. 21B, pixel values are distributed in the left lower direction in S151 as shown in FIGS. 21D to 21G. When the 45° condition is satisfied in S149 and a connection length in the 45° right upper direction is calculated in S150 as shown in FIG. 21C, pixel values are distributed in the right upper direction in S151 as shown in FIGS. 21H to 21K.

As to concrete pixel values to be distributed, a description will be given later with respect to both cases of horizontal and vertical directions, including the case of the 45° direction. Also in the case of this C2 thick line, not only, for the sake of the, processing is performed in S145 in the case of the connecting direction being a horizontal direction and in S151 in the case of the connecting direction being a vertical direction, but also both processings may be made common to each other.

Thereafter, in S146 or S152, in connection with the C2 thick line, it is determined whether the 2×2 block has been initially sorted to checks (thin line) or not and whether the processing has been the first processing or not. As to the 2×2 block initially sorted to checks (thin line) and thereafter sorted to the C2 thick line, the position of the target 2×2 block is shifted by one pixel in a predetermined direction in S147 and S153, followed by return to S142 and S148 to perform processing again.

FIG. 22 is an explanatory diagram of block positions in the case of performing a second C2 thick line processing when the block concerned is sorted to The C2 thick line after being determined to be a thin line. For example, in the case where the block concerned is sorted to the C2 thick line after being determined to be a thin line and where the connecting direction is a horizontal direction, as shown in FIG. 22A, 2×2 pixels lying at the position shifted downward by one pixel relative to the target 2×2 block are made a block to be processed in S147, followed by return to S142 to repeat the C2 thick line processing in the horizontal direction. For example, in the case where the block concerned is sorted to the C2 thick line after being determined to be a thin line and where the connecting direction is a vertical direction, as shown in FIG. 22B, 2×2 pixels lying at the position shifted by one pixel to the right are made a block to be processed in S153, followed by return to S148 to repeat the C2 thick line processing in the vertical direction. As the repeated C2 thick line processing there may be performed the foregoing C2 thick line processing in a C2-C1 exchanged state.

In this way the processing for the C2 thick line is also ended. As noted earlier, also with respect to a C2-C1 exchanged pattern from the pattern shown in FIGS. 4A to 4D, there may be performed processing in accordance with the sorting to the thin line, C1 thick line and C2 thick line described above. By performing the above processing for all the blocks, the results of the processing are stored in the memory 2 and therefore all that is required is the output of the image after the processing (in this example an antialiased double-enlarged image) to the image output section 4.

Figure 24:
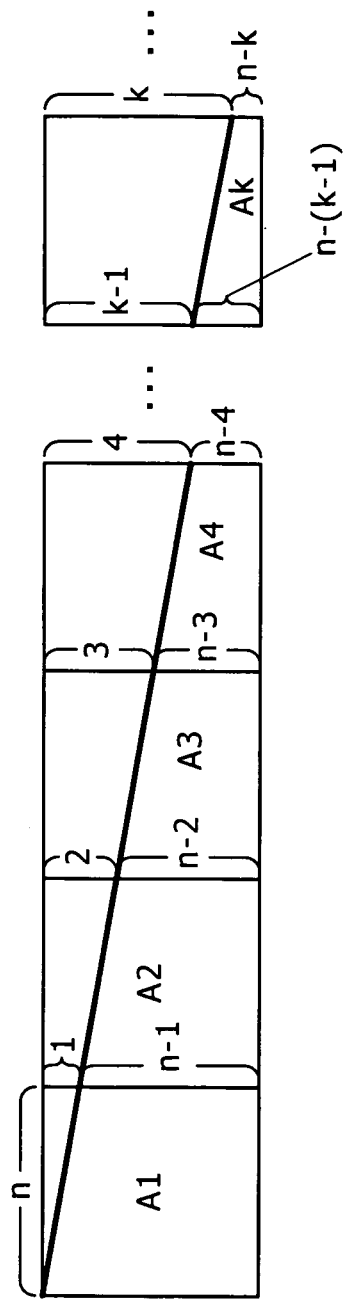
FIG. 24 is an explanatory diagram of an area occupancy of an edge line relative to the C1 thick line in a horizontal direction.

The following description is now provided about a concrete processing method related to the layout of pixels which is performed in S126, S132, S145 and S151. Pixel values to be arranged by the image quality improving process are outputted in horizontal, vertical and 45° directions as shown in FIGS. 10A to 10K, 13A to 13K, 14A to 14K, 17A to 17K, 20A to 20K and 21A to 21K. FIGS. 23A to 23F are explanatory diagrams showing an example of an exact angle and a pixel layout for the C1 thick line in a horizontal direction and FIG. 24 is an explanatory diagram of an area occupancy of an edge line relative to the C1 thick line in a horizontal direction. For example, when processing on a rightward edge in a horizontal direction is considered with respect to the 2×2 pattern of the C1 thick line shown in FIGS. 23A to 23F, processing in all horizontal and vertical directions can be done by a combination of vertical (transverse) inversion of this processing, 90° unit rotation and exchange of C1-C2 pixel values. When processing on an edge in 45° right downward direction is considered, as shown in FIGS. 25A to 25F which will be referred to later, processing in all 45° directions can be done also by a combination of vertical (transverse) inversion of this processing, 90° unit rotation and exchange of C1-C2 pixel values. Therefore, if corrected pixel values in a horizontal direction (one side) and 45° direction (one side) are provided, they can be made common for the correction in all directions. For example, they can be tabulated and used in an appropriate form at the time of processing in each direction. Calculation of corrected pixel values in the horizontal and 45° directions is performed in accordance with the concept of an area occupancy of an edge in pixel in antialiasing. The following description is now provided about how to calculate corrected pixel values.

First, with reference to FIGS. 23A to 23F and 24, a description will be given about a method for calculating pixel values when newly arranging n number of pixels at corresponding positions in the case where the connecting direction is a horizontal direction and the connection length is n. FIG. 23A shows an example of a 2×2 block sorted to the C1 thick line. In this case, if there are continued two pixels of C2 up and C1 down in the right direction of the 2×2 block, there is the possibility that an edge is present in a horizontal direction. In such a case, the connection length is calculated by the method described above and dots are arranged in the portion of the C1 thick line by an number corresponding to the connection length, as shown in FIG. 23B. FIG. 23B shows an example in which the connection length is 4.

At this time, it is assumed that there are present an edge shown in FIG. 23C if the connection length is 2, an edge shown in FIG. 23D if the connection length is 3, an edge shown in FIG. 23E if the connection length is 4, and an edge shown in FIG. 23F if the connection length is 5. In these cases, since edge angles are calculated exactly from the connection lengths as shown in FIGS. 23C to 23F, there may be calculated an area occupancy of an edge line at each of these angles in pixels upon layout of the pixels.

If the length of one side of one pixel is n, one pixel is regarded as n×n unit and the area on the lower side of an edge line is written as $A_1, \ldots, A_n$ successively from the left side, as shown in FIG. 24, n number of pixel values to be distributed can be given as follows by calculating the area of a trapezoid and for k=1, ..., n:

$$A_k = ((n - (k - 1)) + (n - k)) \cdot n / 2$$
$$= (2n - 2k + 1) \cdot n / 2$$

Each pixel value can be obtained as follows in terms of a ratio to an area value ($=n^2$) of the whole of pixels:

$$P(A_k) = (C2 - (2n - 2k + 1) \cdot n / 2) / n^2 \times (C2 - C1)$$
$$= C2 - (2n - 2k + 1) / (2n) \times (C2 - C1)$$

This equation represents a value in the case of the C1 thick line. In the case of a C2-C1 exchanged pattern in FIG. 23, a C2-C1 exchanged value of the value calculated by the above equation is the value to be obtained, that is:

$$P(A_k) = (C1 - (2n - 2k + 1) \cdot n / 2) / n^2 \times (C1 - C2)$$
$$= C1 - (2n - 2k + 1) / (2n) \times (C1 - C2)$$

According to this processing, color values between the target colors C1 and C2 is divided equally in the unit of n, and n intermediate colors are arranged. As will be described later, in the case where C1 and C2 each indicate a color pallet number in a color map, actual colors, not C1 and C2, in the color map indicated by C1 and C2 are substituted into the above equations. In such a case, equally (=n) divided colors are outputted in an appropriate color space (e.g., RGB). Also as will be described later, in the case of preparing an enlarged image of limited colors directly from an original image of limited colors without antialiasing, there may be used the following equations:

for the C1 thick line, $$P(A_k) = C1 \ldots \text{when } (2n - 2k + 1)/(2n) > 0.5$$
$$= C2 \ldots \text{when } (2n - 2k + 1)/(2n) \leq 0.5$$

for the C2 thick line, $$P(A_k) = C2 \ldots \text{when } (2n - 2k + 1)/(2n) > 0.5$$
$$= C1 \ldots \text{when } (2n - 2k + 1)/(2n) \leq 0.5$$

Since pixels are arranged for the improvement of image quality relative to the double-enlarged image on the basis of connection length in the above manner, the layout of pixels is made, for example, up to only a half of pixels corresponding the connection length in the original image. For example, if the connection length is 4, there exists a connection length of eight pixels in the case of a double-enlarged image, but the number of pixels arranged is four. For example, if the connection length is 4 and a difference in height is again present at a position advanced four pixels on the original image, the remaining four pixels in the double-enlarged image are arranged in the image quality improving process for the difference in height. Consequently, for example as to an obliquely linearly continuous edge, pixels are arranged by the image quality improving process half on each of both-side stepped portions which sandwich a flat portion therebetween, whereby it is possible to improve the image quality as a whole.

FIGS. 25A to 25F are explanatory diagrams showing an example of pixel layout by the image quality improving process relative to the C1 thick line in the 45° direction and FIG. 26 is an explanatory diagram of an area occupancy of an edge line relative to the C1 thick line in the 45° direction. With reference to FIGS. 25A to 25F and 26, a description will be given about a method for calculating pixel values when newly arranging 2n number of pixels at corresponding positions in the case where the connecting direction is 45° direction and the connection length is n. FIG. 25A shows an example in which the block pattern is a C2-C1 exchanged C1 thick line pattern. In this case, if left connection length=2, right connection length=1, and if right-left C2-C1 pixel pairs continue in the right lower direction of the 2×2 block, there is the possibility that an edge may be present in the right lower direction. Also in such a case, a connection length is calculated in the manner described above and dots are arranged by a number corresponding to the connection length as shown in FIG. 25B. FIG. 25B shows an example in which the connection length in the 45° direction is 4.

In this case, it is presumed that there exist an edge shown in FIG. 25C if the connection length is 2, an edge shown in FIG. 25D if the connection length is 3, an edge shown in FIG. 25E if the connection length is 4, and an edge shown in FIG. 25F if the connection length is 5. Also in these cases, since edge angles are calculated exactly from the connection lengths, all that is required is calculating the area occupancy of an edge line of each such angle in pixels as arranged.

For calculating the value of 2n number of pixels to be arranged, as shown in FIG. 26, the length of one side in one pixel is set at n+1, (n+1)×(n+1) is regarded as a unit, and for the area on the upper side of the edge line, $A_1, \ldots, A_n$ are applied successively from the left side to the left pixels of 2-pixel pairs and likewise $B_1, \ldots, B_n$ are applied successively from the left side to the right pixels of the 2-pixel pairs, followed by calculation of the area of each triangle, affording for k=1, ..., n:

$$A_k = (n-k+1)^2 \cdot (n+1)/2n$$

$$B_k = (n+1)^2 - k^2(n+1)/2n$$

Therefore, respective density values can be obtained as follows in terms of a ratio to the area value ($=(n+1)^2$) of the whole of pixels:

$$P(A_k) = C2 - ((n-k+1)^2 \cdot (n+1)/2n)/((n+1)^2) \times (C2 - C1)$$
$$= C2 - ((n-k+1)^2/2n(n+1)) \times (C2 - C1)$$

$$P(B_k) = C2 - ((n+1)^2 - k^2(n+1)/2n)/((n+1)^2) \times (C2 - C1)$$
$$= C2 - (1 - k^2/2n(n+1)) \times (C2 - C1)$$

The above equations give values in the case of the C2 thick line. In the case of C2-C1 exchanged pattern in FIG. 25, C2-C1 exchanged values of the values calculated by the above equations are obtained, that is:

$$P(A_k) = C1 - ((n-k+1)^2/2n(n+1)) \times (C1-C2)$$

$$P(B_k) = C1 - (1 - k^2/2n(n+1)) \times (C1-C2)$$

Also in this processing, color values between the target colors C1 and C2 is divided equally in the unit of n and n intermediate colors are arranged. In the case where C1 and C2 each indicate a color pallet number in a color map, actual colors, not C1 and C2, in the color map indicated by C1 and C2 are substituted into the above equations. In such a case, there are outputted equally (=n) divided colors are outputted in an appropriate color space (e.g., RGB). In the case of preparing an enlarged image of limited colors directly from an original image of limited colors without antialiasing, there may be used the following equations:

for the C1 thick line, $$P(A_k) = C1 \ldots \text{when } ((n-k+1)^2/2n(n+1)) > 0.5$$
$$= C2 \ldots \text{when } ((n-k+1)^2/2n(n+1)) \leq 0.5$$

$$P(B_k) = C1 \ldots \text{when } (1 - k^2/2n(n+1)) > 0.5$$
$$= C2 \ldots \text{when } (1 - k^2/2n(n+1)) \leq 0.5$$

for the C2 thick line, $$P(A_k) = C2 \ldots \text{when } ((n-k+1)^2/2n(n+1)) > 0.5$$
$$= C1 \ldots \text{when } ((n-k+1)^2/2n(n+1)) \leq 0.5$$

$$P(B_k) = C2 \ldots \text{when } (1 - k^2/2n(n+1)) > 0.5$$
$$= C1 \ldots \text{when } (1 - k^2/2n(n+1)) \leq 0.5$$

As described above, if corrected pixel values in a horizontal direction (one side) and a 45° direction (one side) are tabulated in terms of connection lengths (exact a angles), all the correction angles can be obtained by reference to the table. In this case, a table may also be prepared with respect to C2-C1 exchanged patterns.

Supplementary explanations will now be given in connection with the above description. The present embodiment is greatly characterized in that processing is performed for all portions of an image on the basis of the assumption that a limited color image can be constricted to information on only two significant colors locally. Actually, at the beginning of processing of each target block there are set target colors C1 and C2 (C1≠C2) and the subsequent processing is also performed while paying attention to only C1 and C2. By always making limitation to the two colors, it is possible to effect processing in the same manner as a binary image being processed in each portion.

For example, when a color changes minutely for each pixel, there occurs a case where the block pattern concerned is sorted to none of the C1 thick line, C2 thick line and a thin line. Processing is not performed for such a local region and hence the original image (an image enlarged by the nearest neighbor method) remains as it is. Therefore, even if processing is performed on the basis of the foregoing assumption, there scarcely occurs any inconvenience in a portion not matching the assumption. Rather, in a limited color image, there exist many edge portions widely different in color like a linear drawing and the antialiasing process is applied to those edges, or also with respect to an enlarged image, since edges are smoothly interpolated, it is possible to improve the image quality in the greater part within the image.

Thus, the way of thinking based on limitation to only two colors is adopted and therefore, in the case of performing the enlarging process not involving the antialiasing process, that is, in the case where the value of the output pixel value C is made either the target pixel value C1 or C2 (the larger area occupancy side), there accrues an advantage that it is not necessary at all to consider concrete colors. The limited color image is in many cases provided as an image with color map, but in this case a color pallet number, not an actual color, is allocated to each pixel value. For example, in the case of an image with 256-color map, a pallet table with pallet numbers 0 to 255 indicating respective colors is attached to the header portion and pallet numbers 0 to 255 are given to the image data portion. For concrete colors, reference is made to the pallet table.

In the case of performing the enlarging process not involving the antialiasing process according to the present embodiment for such an image with a color map, the color map of an input image is copied as it is as a color map of an output image and the enlarging process itself can be done by directly processing image data without reference to the interior of the color map. Actually, in the case of the enlarging process not involving the antialiasing process according to the present embodiment, there is no increase in the number of colors and the target color C1 or C2 is allocated, so that concrete values in the color map do not exert any influence on the processing. Thus, when a limited color image is inputted as an image with color map, the enlarging process not involving an antialiasing process according to the present embodiment is quite effective in terms of image quality and speed.

As noted above, the present embodiment utilizes the assumption that significant information in each local region of a limited color image can be restricted to two colors. Japanese Published Unexamined Patent Application No. Hei 10-336697 is mentioned as a literature disclosing a conventional technique which uses the concept of extracting two-color information. In this method, the enlarging process itself uses a linear interpolation method. After enlargement, the color of an edge portion in an enlarged image obtained finally is replaced by a half tone value obtained from limited colors in the original image, thereby eliminating an inconvenience associated with color. Thus, the decision of two target colors in this conventional method is used at the time of finally adjusting the color rather than utilizing it at the time of enlarging the image. It is not that limitation is made to two significant colors and an image is enlarged in the sense of the present embodiment. On the other hand, also when preparing from an original image of limited colors an enlarged image of the same limited colors as in the original image, two significant colors are selected for each 2×2 block and edge direction and length are extracted while taking note of the two colors. Also as interpolated pixels there are arranged these two colors directly. That is, it can be said that the assumption of significant information in each local region of a limited color image being able to be restricted to two colors is utilized as it is.

By utilizing the viewpoint that significant information on a limited color image can be restricted to two colors locally, it is possible to effect an appropriate determination processing before the start of processing and also at the time of determining whether an inputted image is a limited color image or not. For example, if the proportion of two- or less-color blocks is 90% or more out of all 2×2 blocks as a result of scanning the whole of an inputted image, it may be determined that the inputted image is a limited color image. By performing such a processing at the time of determining the limited color image, a natural limited color image prepared from a contone image can be regarded as being outside the object of processing. This is because in the case of a natural limited color image formed from a contone image, although it is a limited color image, the nature thereof is rather close to that of the contone image and a processing for a contone image may be adopted as the enlarging process. Conversely, even in the case of a contone format image without limitation in the number of colors, if it uses only limited colors as in a linear drawing, it can be determined to be a limited color image by the above determination processing and the present embodiment is applicable thereto.

Figure 27:
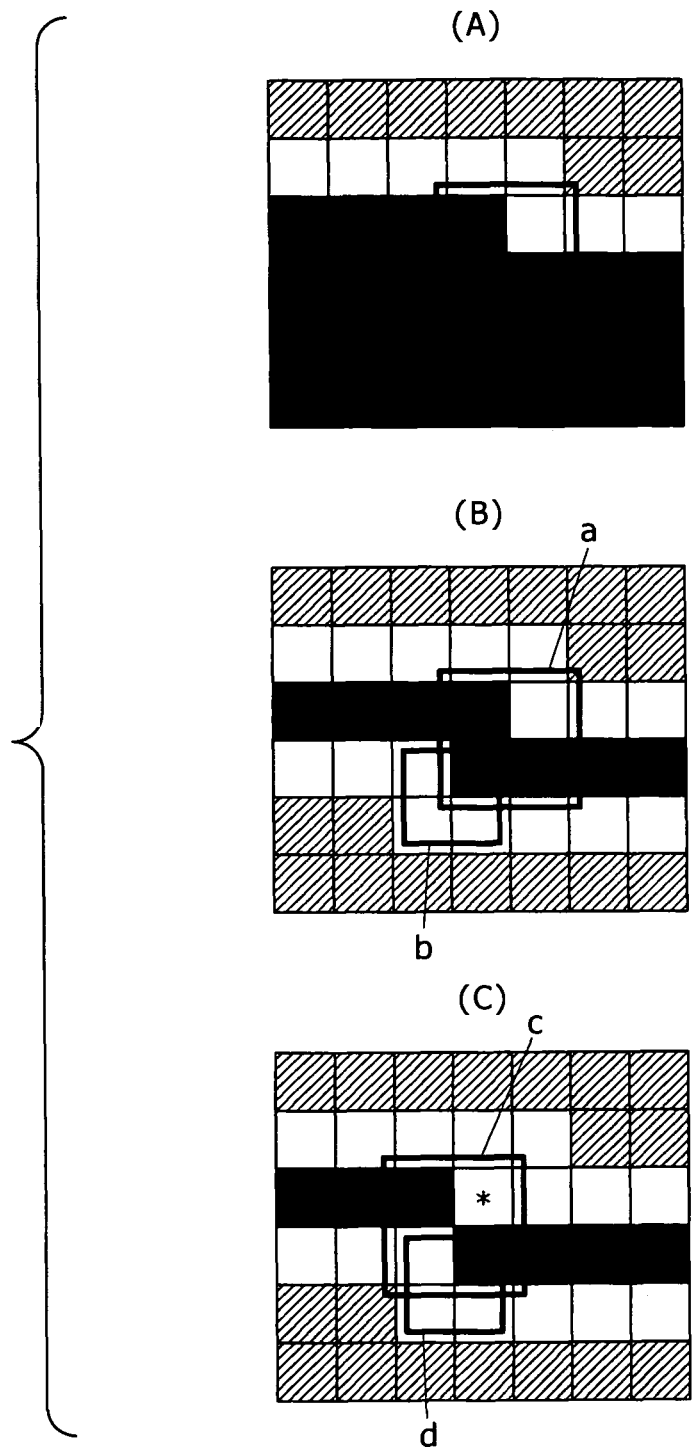
FIGS. 27A to 27C are diagrams explanatory of a difference between the case where the block concerned is determined to be originally the C1 thick line and the case where it is determined to be a thin line (checks)

The following description is now provided about the reason why processing is repeated twice for the C1 or C2 thick line with respect to a 2×2 block sorted to a thin line (checks). FIG. 27 is a diagram explanatory of a difference between the case where the block concerned is originally determined to be the C1 thick line and the case where it is determined to a thin line (checks). FIGS. 27A and 27B are of the case where the clock concerned is originally determined to be the C1 thick line. The 2×2 block originally determined to be the C1 thick line is subjected to a correction processing on one side (upper side in this example) of the thick line. As to the other side (lower side in this example) of the thick line, it will be apparent that only the processing of the upper edge will do in such a portion as a mere step edge, as shown in FIG. 27A. The state wherein a certain region is painted out, or a segment of a very wide stroke width, corresponds to this case.

As shown in FIG. 27B, when processing proceeds after the correction processing of the C1 thick line by a 2×2 block a for the upper edge of the thick line and a 2×2 block b has become an object of processing for the opposite-side (lower-side) edge of the thick line, there again is performed the correction processing of the C1 thick line as a C2-C1 exchanged C1 thick line. Therefore, as to a 2×2 block processed originally as the C1 thick line or C2 thick line, there will arise no problem if the correction processing is performed for only the 2×2 block.

Next, as shown in FIG. 27C, in the case where processing is performed with the thin line (checks) portion as the C1 thick line, the correction processing is performed for one side (upper side in this example) of the thin line when a 2×2 block c has become an object of processing. As to the other side (lower side in this example) of the thin line, a look at FIG. 27C shows that when a 2×2 block d has become an object of processing with advance of the processing, the block pattern becomes a C2-C1 exchanged the C1 thick line. However, since the pixel indicated by "*" is C2, the block pattern in question is excluded from the object of processing in the determination of the C1 thick line (r2 in FIG. 9B) and the correction processing is not applied thereto.

To avoid this inconvenience the system is constructed so that in the case of checks the processing is performed at the same time also for the 2×2 block d. This processing is, for example, the processing from S128 to S123, from S134 to S139, from S147 to S142, and from S153 to S148, in FIGS. 6 and 7. In the second processing, since the value of r2 shown in FIG. 9B is not checked, it is possible to effect processing of the block as the C1 thick line.

Of course, if the conditions of the determination in sorting are slackened to omit the check of r2 value, the 2×2 blocks c and d shown in FIG. 27C can be processed separately. Thus, it is not always essential to perform processing at two places as far as a thin line is concerned. However, in the case of a thin line, unlike thick lines, there surely is present another side of edge in a 2×2 block shifted by one pixel from the processed 2×2 block, so that, from the standpoint of image quality, processing may be performed on both sides simultaneously upon detection of a thin line, which is error-free.

Although in the above description the horizontal, vertical and 45° directions are illustrated up to only six pixels as an example of calculation of connection lengths, reference to pixels may be made up to ends of an image at most in accordance with the same procedure as above or the reference may be stopped at a certain point. For example, when about sixteen pixels are referred to vertically and transversely, it is possible to pick up edges up to low-angle edges and hence possible to attain a high image quality in a positive manner. Of course, when referring to neighboring pixels present around those pixels, it is necessary to take care so that the scan area does not protrude to the exterior at upper, lower and right, left ends of the image concerned. The vertical and transverse reference range may be made, not fixed, but parameters and selectable depending on the balance between image quality and speed.

In the above description, moreover, at the time of calculating a connection length in the 45° direction, a connection length in a horizontal or vertical direction is once calculated and thereafter a connection length in the 45° direction is calculated. Since this processing is performed only when the connection length is 2 or 1, even if the connection length is calculated twice, a heavy load does not result because the preceding processing is light. In addition, the connection length is calculated on both right and left sides in the case of a horizontal direction, on both upper and lower sides in the case of a vertical direction, but on only one side in the 45° direction in the case of 45°, so that also from this point the load does not increase so much. Of course, horizontal, vertical and 45° directions may be determined simultaneously. In this case, the number of pixels referred to in the rough angle calculation processing increases.

In the above processing there sometimes is a case where pixels already processed again become an object of the image quality improving process. For example, in the case of a thin line (checks) having been processed, there sometimes is a case where the block present one line ahead is also subjected to the processing as described above. For this reason there occurs a case where the processing of some pixels overlaps the processing of the next line. In such a case, priority may be given to the result of the preceding processing, or vice versa, or there may be used a mean value between the results of the preceding and succeeding processings.

Figure 34:
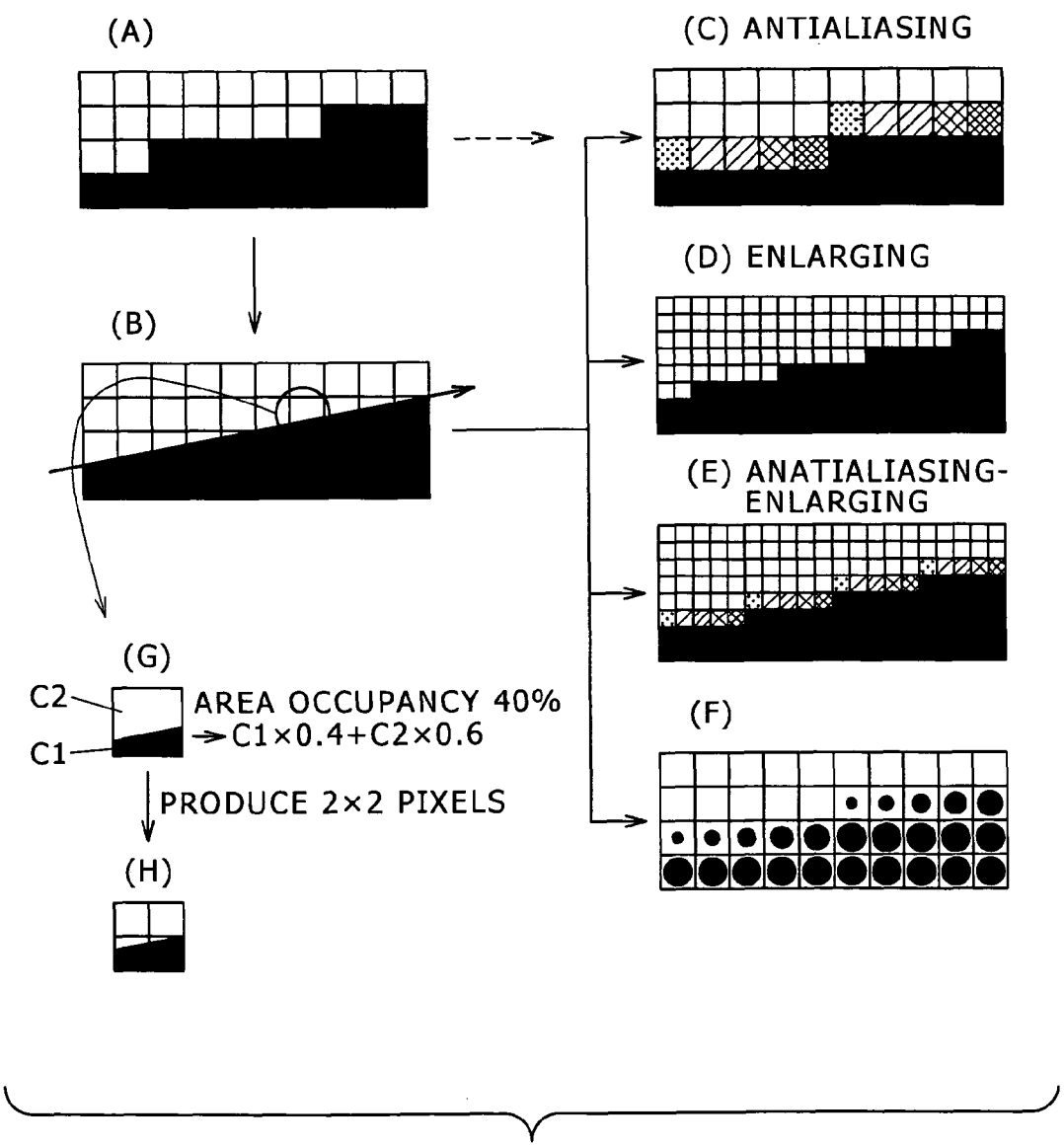
FIGS. 34A to 34H are explanatory diagrams showing an example of a relation between the image quality improving process and the concept of area occupancy.

The above description has been made mainly on the basis of the antialiasing-enlarging process. However, no limitation is made thereto. The present embodiment is applicable to the antialiasing process not involving enlargement and also to the enlarging process. As described above in connection with FIGS. 33 and 34A to 34H, the concept of the antialiasing-enlarging process can be positioned as a generic concept of the antialiasing process and the enlarging process. Therefore, if the antialiased-enlarged image formed by the above processing is made limited in color, there is obtained an enlarged image, while by mean value contraction there is obtained an antialiased image. As described above, however, an enlarged image can be obtained in a simpler manner by adopting the foregoing method of arranging limited colors directly. In the above description, for an edge portion of an image pre-enlarged by the nearest neighbor method, there is performed a processing for imparting thereto the effect of FIG. 34D. As noted earlier, the image quality improving process involves the enlarging process, which, however, may be designated a processing for a higher resolution when viewed from the standpoint just mentioned above.

Generally, in the case of enlarging a limited color image and printer-output thereof, such an enlarged image may be formed directly without going through the antialiasing process. By so doing, the total number of colors or the number of bits of an input image and the total number of colors or the number of bits of an output image become coincident with each other and thus it is not necessary to provide an extra memory for an increase in the number of colors. A moderate degree of blur effect results from the antialiasing process and this contributes to usefulness in the case of seeing an enlarged image on a screen. However, in the case of printer-output, enlargement not involving a mere increase in the number of colors may be adopted also from the standpoint of image quality. This is also because, in a limited color image, there are a lot of binary elements (a certain color C and a white portion of paper) within the image, for example in the case of a map or a drawing. As a method for making an antialiased-enlarged image a limited color image there may be adopted, as described above, a method wherein the pixels of the antialiased-enlarged image are replaced by a color of the shortest distance out of the limited colors used in the original image. If mean value contracted pixel values of corrected pixel values are tabulated in advance, an antialiased image can be formed directly by a weighted means between those values and the original image.

Figure 28A:
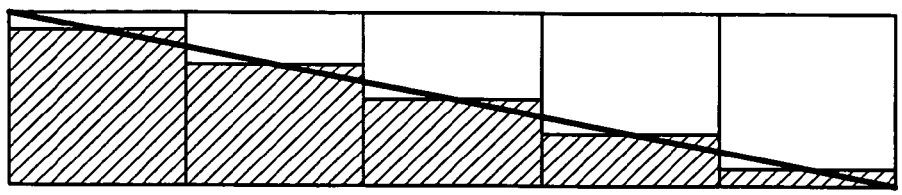
FIGS. 28A and 28B are explanatory diagrams showing another example of pixel values arranged for improving the image quality.
Figure 28B:
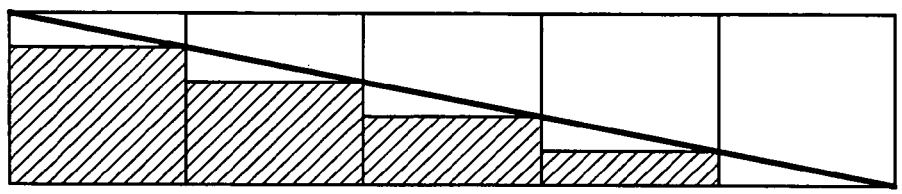

In the above description, moreover, when newly arranging pixel values, this is performed in accordance with an area occupancy of an edge passing through pixels. Of course, the number and density of pixels arranged are not limited to the above example. FIGS. 28A and 28B are explanatory diagrams showing another example of pixel values arranged for the improvement of image quality. In the example in FIGS. 28A and 28B there is illustrated an estimated edge line in the case of the connection length being 5. FIG. 28A shows corrected pixel values obtained in terms of the foregoing area occupancy. The pixel values arranged are equal to an area ratio of the hatched region relative to the whole of pixels.

On the other hand, FIG. 28B shows an example in which the hatched area ratio is set smaller than the area occupancy of an estimated edge line. This example brings about the effect of making the edge line thinner than in the example of FIG. 28A. Corrected pixel values may be corrected uniformly in advance in accordance with characteristics of an output device and on the basis of corrected pixel values based on such area occupancy.

The above description has been given in a divided manner for each edge direction in order to facilitate understanding of the processing of each portion. However, in addition to the point that the processing method for thick lines can be used in common to the thin line portion, which is a feature of the present embodiment, a larger number of portions can be made common by a combination of vertical (transverse) inversion, 90° unit rotation, and C1-C2 exchange. That is, by managing information on, for example, the block reference start position, write start position and the second processing position in the case of a thin line (checks), the structure of the processing itself becomes very simple. Particularly, in the above example, since the determination of a thin line and C1 and C2 thick lines is made in a 2×2 block and the determination of a rough angle is made in a 3×3 block, there are few wasteful reference pixels and a high speed is attained. In addition, using blocks in such a small unit also leads to the prevention of determination error and permits the attainment of a high image quality in a positive manner.

The antialiased-enlarged image thus prepared is in such a state as a double-enlarged image is antialiased. Not only both double enlargement and antialiasing (antialiasing-enlarging process) are performed simultaneously, but also the loss of information upon antialiasing is prevented by double enlargement. That is, since image information is held appropriately and the image quality is high, this contributes to more usefulness also at the time of expansion or contraction in the subsequent stage.

Figure 29:
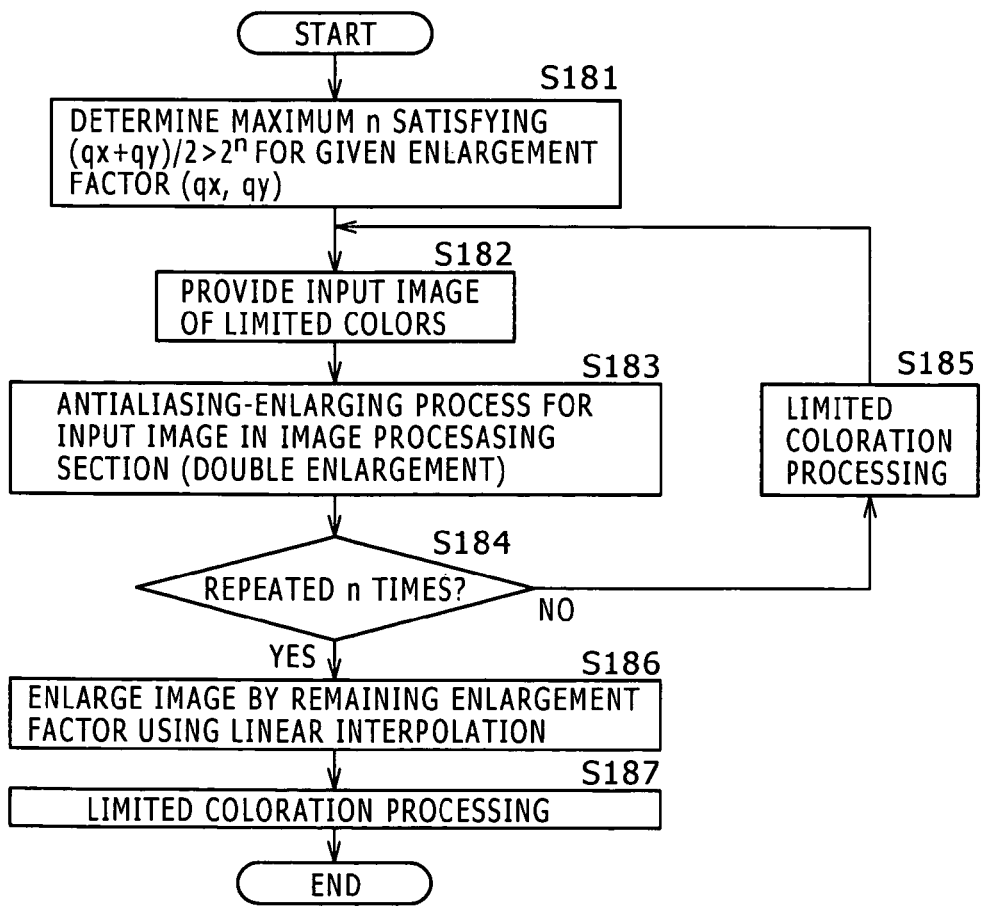
FIG. 29 is a flowchart showing an example of an enlarging process with an arbitrary enlargement factor.

Further, the present embodiment is applicable to enlarging a limited color image to a high quality image of an arbitrary enlargement factor. As a method for forming an enlarged image of an arbitrary enlargement factor in high quality by utilizing the method of the present embodiment, there may be adopted any of several methods. FIG. 29 is a flowchart showing an example of an enlarging process with an arbitrary enlargement factor. According to the method shown in FIG. 29, first in S181, there is selected a maximum integer of n>0 which satisfies the relation of (qx: horizontal enlargement factor, qy: vertical enlargement factor), $(qx+qy)/2>2^n$, relative to a given enlargement factor (qx, qy). Then, in S182, there is provided an input image of limited colors as an image to be processed. First, an original image is used as the image to be processed. In S183, an antialiased-double enlarged image is formed from the image to be processed by the foregoing method. In S184 it is determined whether repetition has been made n times or not. Until n times, the antialiased-enlarged image is made a limited color image in S185, followed by return to S182, in which the antialiased-enlarged image (an enlarged limited color image) thus made a limited color image is regarded as a new image to be processed.

Such a processing for the antialiased double-enlarged image+limited coloration is repeated a total of n times while updating the image to be processed each time. Thereafter, in S186, the image is enlarged by the remaining enlargement factor with use of a predetermined method such as a linear interpolation method and is eventually made a limited color image again in S187. By such a processing it is possible to generate an image which is enlarged qx×qy times relative to the original image.

The linear interpolation method performed in S186 is an enlarging method apt to induce blur, but even if the antialiased-enlarged image after conversion to a sufficiently high resolution by the method according to the present embodiment is further enlarged by a linear interpolation method of an enlargement factor of less than 2, it is scarcely influenced by blur caused by the linear interpolation method. The image thus prepared is an enlarged image corresponding to the original limited color image subjected to the antialiasing process, therefore, by finally making it a limited color image using the same colors as in the original image, there is obtained an enlarged limited color image.

FIG. 30 is a flowchart showing another example of an enlarging process with an arbitrary enlargement factor. According to the method shown in FIG. 30, first in S191, there is selected a maximum integer of n>0 which satisfies the relation of (qx: horizontal enlargement factor, qy: vertical enlargement factor), $(qx+qy)/2>2^n$, relative to a given enlargement factor (qx, qy), then in S192 there is provided an input image of limited colors as an image to be processed. Then in S193 a double-enlarged limited color image is prepared without going through the antialiasing process from the image to be processed by the foregoing method. In S194, it is determined whether repetition has been made n times or not, and until n times, the processing flow returns to S192 and the processing for generating a double-enlarged limited color image is performed in S193.

Such a limited color double enlarging process not involving the antialiasing process is repeated a total of n times while updating the image to be processed each time. Thereafter, in S195, the image is enlarged by the remaining enlargement factor with use of a predetermined method such as the nearest neighbor method. By such a processing it is possible to generate an image which is enlarged qx×qy times relative to the original image.

The nearest neighbor method is apt to cause jaggy, but the image after conversion to a sufficiently high resolution by the method according to the present embodiment is scarcely influenced by the jaggy which occurs under the influence of the nearest neighbor method even if it is further enlarged by the nearest neighbor method of an enlargement factor of less than 2. This is because, particularly in the case of printer output, a halftoning process is performed for the limited color image and therefore the jaggy caused by the final enlargement by the nearest neighbor method is absorbed by jaggy based on the structure of clustered dots in the halftone image. In other words, even if the final enlarging process is changed to a method higher in image quality, jaggy is induced by the halftone structure. Thus, it can be said that the final nearest neighbor method exerts little influence in the case of printer output. Another reason for using the nearest neighbor method is that it contributes to usefulness in processing because the nearest neighbor method is an enlarging process not causing an increase in the number of colors like the present embodiment.

FIG. 31 is a flowchart showing a further example of an enlarging process with an arbitrary enlargement factor. In the method shown in FIG. 30, an input image of limited colors as an image to be processed is provided in S201, then in S202 a limited color double-enlarging process not involving the antialiasing process is performed by the above method. Thereafter, in S203, the image is enlarged by the remaining enlargement factor with use of the nearest neighbor method.

In this method, the influence of jaggy caused by enlarging the remaining enlargement factor with use of the nearest neighbor method becomes stronger. Even so, the effect obtained by performing first the double enlarging process according to the present embodiment is still outstanding and the effect of attaining a high image quality can still be (exhibited in comparison with the method wherein the whole enlargement is subjected to the nearest neighbor method. In the case of using the method shown in FIG. 31, there is attained a higher speed as compared with the method of repeating the double enlargement according to the present embodiment which has been described above in connection with FIGS. 29 and 30. Thus, it can be said that the method shown in FIG. 31 is a useful method because it is higher in speed than the foregoing two methods and can attain a sufficiently high image quality as compared with the conventional method.

Of course, as the enlargement method for arbitrary enlargement factors, there may be adopted a method of obtaining an enlarged image by enlargement factor of n (n is an integer) directly other than the method using double enlargement. More specifically, there may be adopted a method wherein an edge line is estimated and pixels are divided more minutely, then an area occupancy of the edge line crossing the pixels is obtained in horizontal (one side) and 45° (one side) directions as described above in connection with FIGS. 23A to 23F to 26 and FIGS. 28A and 28B. Generally, the method of updating the image concerned at every enlargement factor of 2 can afford an image more difficult to generate jaggy because minute angle correction is performed at every updating. There sometimes is a case where by a combination with such a method of direct enlargement to a greater enlargement factor than 2 there can achieve a higher speed without deterioration of the image quality.

Although the above example is based on block units of M=2 and N=2, the same as above is also true of other block units. That is, after extraction of a thin line and C1 and C2 thick lines, the thin line portion is sorted to the C1 or C2 thick line and the C2 thick line processing is shared with the C1 thick line processing by the utilization of symmetricity. After all, the image quality can be improved by applying the C1 thick line processing to all portions. As noted above, the thin line when seen on only one side thereof provides the same shape as the thick line, so if a processing for correcting one side of the thick line appropriately is constituted, it can be applied also to the thin line. However, it can be said that the size of M=2 and N=2 is superior when viewed from both standpoints of high speed and high image quality. This is because, as the block size increases, the determination becomes more complicated and the processing time becomes longer, further, such omissions as cannot be picked up in the determination, which are attributable to the large block size, also increase. An advantage of the image quality improving method according to the present embodiment resides in a simple processing of regarding the block pattern concerned as a thin line or a thick line and permitting the improvement of image quality for all portions as the thick line. Still higher speed and image quality are attained by using such a small block size as M=2 and N=2.

Figure 32:
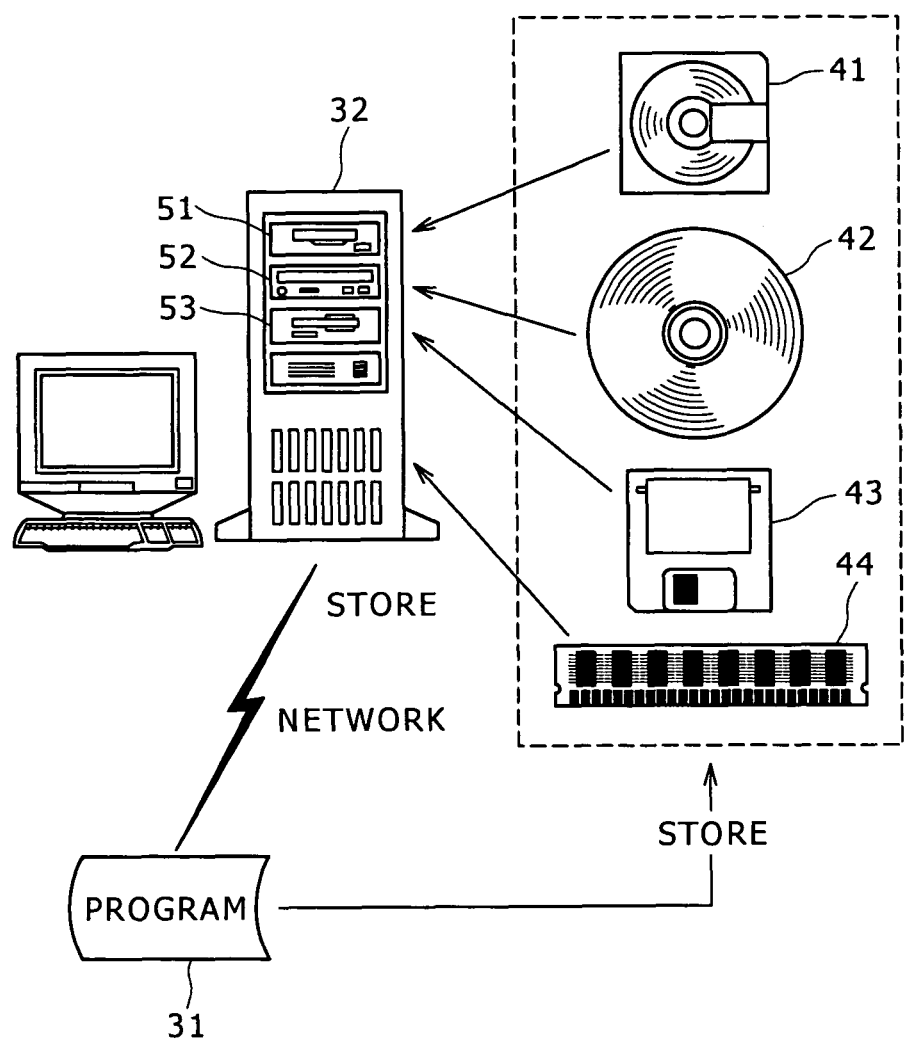
FIG. 32 is an explanatory diagram showing an example of a computer program which implements the function of the image processing apparatus and the image processing method, as well as a storage medium which stores the computer program.
Figure 33:
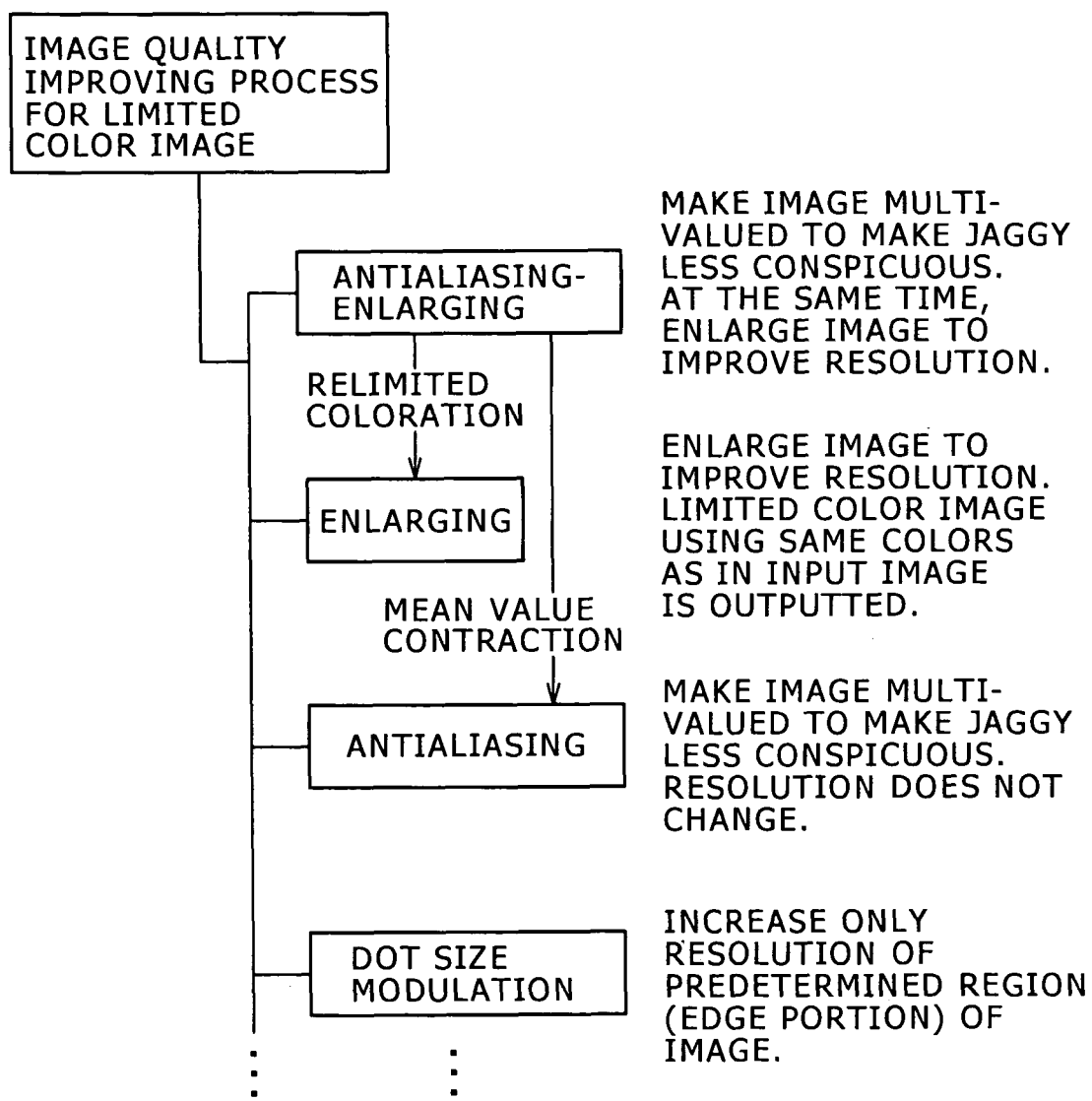
FIG. 33 is an explanatory diagram showing an example of an image quality improving process related to a conventional limited color image enlarging process.

FIG. 32 is an explanatory diagram showing an example of a computer program which implements the function of the image processing apparatus and the image processing method according to the present embodiment and a storage medium which stores the computer program. In the same figure, the numeral 31 denotes a program, 32 denotes a computer, 41 denotes a magneto-optic disk, 42 denotes an optical disk, 43 denotes a magnetic disk, 44 denotes a memory, 51 denotes a magneto-optic disk drive, 52 denotes an optical disk drive, and 53 denotes a magnetic disk drive.

The function of the image processing section 3 described in the above embodiment of the present invention can be implemented also by the program 31 which can be executed by a computer. In this case, the program 31 and data which the program uses can also be stored on a storage medium readable by a computer. The storage medium indicates a medium which can induce a state of change of energy such as magnetism, light, or electricity in accordance with description contents of the program relative to a reader provided in hardware resources of the computer and transmit the description contents of the program to the reader in the form of a corresponding signal. Examples of such a storage medium include the magneto-optic disk 41, optical disk 42, magnetic disk 43, and memory 44 (incl. Ic card and memory card). Of course, these storage media are not limited to portable ones.

The program 31 is stored in any of these storage media and then the storage medium which stores the program is loaded for example to the magneto-optic disk drive 51, optical disk drive 52, magnetic disk drive 53, or a memory slot (not shown), in the computer 32, whereby it is possible to read the program 31 from the computer and execute the function of the image processing apparatus or the image processing method according to the present embodiment. Alternatively, there may be adopted a method wherein the storage medium which stores the program is loaded in advance to the computer 32, then the program 31 is transferred to the computer 32 through a network for example and is stored in the storage medium, then is executed. There may also be adopted a method wherein the program is stored in a storage medium installed in another computer, then is read out, transferred to the computer 32 and executed.

The computer 32 may be integral with the memory 2 and the controller 5 shown in FIG. 1 or may be further integral with the image input section 1 and the image output section 4. Of course, a part or the whole of the function of the present embodiment may be constituted by hardware.

As described above, according to an aspect of the present invention, there is provided an image processing apparatus to perform an enlarging process for an original image constituted by C colors (C≥2), including an target color selecting unit that selects two target colors C1 and C2 for each local region of the original image, a sorting unit that sorts the local region on the basis of a layout of the target colors selected by the target color selecting unit, and a processing unit that determines pixel values after enlargement from the target colors C1 and C2 in accordance with a result of the sorting performed by the sorting unit.

In an image processing apparatus and image processing method involving an enlarging process or an image quality improving process such as an antialiasing process or an antialiasing and enlarging process (antialiasing-enlarging process) performed for an original image of limited colors, an aspect of the present invention is characterized in that a local region such a block of a predetermined M×N pixel size is extracted from the interior of the original image, then two target colors are selected from the extracted local region, the type of the local region is sorted using the selected two target colors C1 and C2, and an enlarging process or an image quality improving process including an antialiasing process corresponding to the sorted type is performed for the local region. In the sorting of the local region, there may be included a thin line and a thick line. The thick line may be further sorted to a first thick line and a second thick line. For example, the first and second thick lines may be made the C1 and C2 thick lines, respectively.

According to an aspect of the present invention, the thin line and the thick line are defined as follows. The thin line is to be a continuous segment including a portion of less than one pixel in stroke width. The segment with less than one pixel in stroke width can be defined as one including a checkered pattern of 2×2 locally within the segment. The thick line is to be a continuous segment of one or more pixels in stroke width, and the case where the color which constitutes the segment is C1 is to be regarded as the C1 thick line and the case where the color which constitutes the segment is C2 is to be regarded as The C2 thick line. As to the thick line there also is to be included an element wherein the stroke width is ∞, that is, only one-side edge line can be recognized. As will be seen from the definitions of the thin line and the thick line, there is a case where both thin line and thick line are present in a continuous segment. Also in such a case, the segment can be sorted to thin and thick lines by diving it into a small size. According to an aspect of the present invention, these sorted elements can finally be processed by a single processing method.

According to an aspect of the present invention, it is not that all of various thin lines and thick lines (C1 and C2 thick lines) present within an image concerned are to be processed, but the processing may be performed for only those that satisfies specific conditions. For example, the present invention may be constructed such that an original image is enlarged beforehand by an enlarging unit, the enlarged image is stored in a storage unit and is then improved its quality as the original image to afford an enlarged image, antialiased image or antialiased-enlarged image of a high quality.

According to a concrete example, a block of 2×2 pixel size is extracted as a local region, then a checkered pattern wherein target colors C1 and C2 are adjacent to each other is sorted as a thin line, a pattern wherein predetermined three pixels are pixels of the target color C1 and one pixel is a pixel of the target color C2 is sorted as a first thick line which is the C1 thick line, a pattern wherein predetermined three pixels are pixels of the target color C2 and one pixel is a pixel of the target color C1 is sorted as a second thick line which is The C2 thick line, then a processing for the first thick line is performed for the first thick line and a processing for the second thick line is performed for the second thick line. This processing method is applicable to not only the interior of a local region but also neighboring pixels present around the local region. In this case, by inverting the color relation with respect to one of the first and second thick lines, the processing for the other can be used in common.

As to the thin line, by sorting the block pattern concerned to either the first or the second thick line or to any other line on the basis of neighboring pixel values present around the block concerned, the thin line processing can substantially be substituted by the thick line processing. In the case of using an image quality improving process in common to both first and second thick lines, the processings for all of the thin line and first and second thick lines can be made intensive to a common processing.

A block sorted to a thin line can be re-sorted as follows. In the case of a region including a local region, e.g., a block including a local region of M×N pixel size, the region of a block not larger than (M+2)×(N+2) size is sorted to the first thick line when the total quantity of C1 pixel in pixel values within the region is not larger than a predetermined number or to the second thick line when the total quantity of C2 pixels is not larger than a predetermined number.

For a block sorted initially to a thin line and subsequently to the first or the second thick line, it may be configured such that after the processing for the first thick line or the processing for the second thick line has been performed, the image quality improving process is repeated for a block shifted by one pixel in a predetermined direction from the block concerned and which pairs with the block concerned.

For processing the thin lines, it may be configured such that it is determined to which of vertical and horizontal directions a direction of a thick line belongs, then an angle of the thick line is determined on the basis of a result of the determination, and a pixel value is outputted in accordance with result obtained. The determination regarding to which of vertical and horizontal directions the thick line direction belongs can be done on the basis of pixel values around an extracted local region. For example, when the extracted local region is a block of M×N pixel size, it is possible to determine to which of vertical and horizontal directions the direction of the thick line concerned belongs on the basis of pixel values within a block of not larger than a predetermined (M+1)×(N+1) size including the aforesaid block.

The determination of the thick line angle can be done by detecting continuity of a predetermined pattern in the determined vertical or horizontal direction. Further, when the result of the determination regarding to which of vertical and horizontal directions the thick line direction belongs satisfies a predetermined condition, it may be determined that the thick line direction is a 45° direction, and in this case the angle of the thick line can be determined by detecting continuity of a predetermined pattern in the 45° direction.

According to an aspect of the present invention, there is provided a storage medium readable by a computer storing an image processing program which causes a computer to execute the foregoing function of the image processing apparatus and the image processing method according to the present invention.

According to an aspect of the present invention, two colors are extracted from each local region of a limited color image and attention is paid to those two colors, then the local region is sorted to, for example, a thin line, a thick line, or any other, then as to the thick line, sorting is further made to, for example, first and second thick lines, and an enlarging process or an image quality improving process such as an antialiasing process corresponding to each sorted type is performed, whereby the processing can be simplified to a great extent and, despite a simple configuration, it is possible to effect an appropriate enlarging process, antialiasing process or antialiasing-enlarging process. For example, a block of 2×2 pixel size can be sorted as a local region and processing can be done for the local region or for neighboring pixels. Thus, it is not necessary to perform such a large size pattern matching or a large number of pattern matchings as in the related art and therefore it is possible to attain a high-speed processing. Further, a processing can be used in common to all of thin line and first and second thick lines, whereby it is possible to attain further simplification of a configuration and speed-up of processing.

Even in the case of a local region being such a small block size as mentioned above, it is possible to determine an edge direction accurately and reflect it in the processing. Therefore, even in the case of performing an antialiasing process or an antialiasing-enlarging process using an area occupancy for example, it is possible to effect the antialiasing process appropriately while holding information on details and hence possible to obtain an image of high quality free from jaggy.

Moreover, since processing is performed in the direction of a line segment included in an extracted local region, it is possible to effect an appropriate image quality improving process also in a direction other than horizontal and vertical directions, e.g., 45° direction.

The foregoing description of the embodiment of the present invention has been provided for the purpose of illustration and description. It is not intended to be exclusive or to limit the invention to the precise forms described. Obviously, many modifications and variations will be apparent to practitioners skilled in the art. The embodiment has been chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus to perform an enlarging process for an original color image data, comprising:
   a target color selecting unit that selects two target colors C1 and C2 for each local region of a plurality of local regions of the original color image data, the local region being a 2×2 pixel block having four pixel locations, the target color C1 being a pixel color of a first single pixel in the local region, each first single pixel of each local region being in a same first pixel location, and the target color C2 being a pixel color of a second single pixel in the local region, each second single pixel of each local region being in a same second pixel location, the first and second pixel locations being different, so that the two target colors C1 and C2 are selected from the first and second single pixel locations, respectively, and the target color selecting unit does not select, for each local region, colors from any other pixel location than the first and second pixel locations;
   a sorting unit that categorizes the local region based on a layout of the target colors selected by the target color selecting unit;
   a processing unit that determines pixel values after enlargement from the target colors C1 and C2 in accordance with a result of the categorizing performed by the sorting unit;
   an enhancing unit that performs at least one of an antialiasing process and an antialiasing-enlarging process as an image quality improving process for the original color image data; and
   a controller for controlling the processing of the target color selecting unit, the sorting unit, the processing unit and the enhancing unit,
   wherein the target color selecting unit selects the two target colors C1 and C2 for each local region independently of selecting two target colors C1 and C2 for any of the remaining local region or regions, and
   the original color image data is formed of image pixels, the image pixels containing more than two different colors.

2. The image processing apparatus according to claim 1, wherein the sorting unit categorizes the local region into any of a thin line, a first thick line and a second thick line.

3. The image processing apparatus according to claim 2, wherein the first thick line is a C1 color thick line and the second thick line is a C2 color thick line.

4. The image processing apparatus according to claim 2, wherein the sorting unit further categorizes the local region categorized into the thin line into at least one of the first thick line, the second thick line and others based on neighboring pixel values around the local region.

5. The image processing apparatus according to claim 4, wherein the sorting unit further categorizes the local region categorized into the thin line into the first thick line when the total quantity of C1 color pixels within a predetermined region including the local region is not larger than a predetermined number or to the second thick line when the total quantity of C2 color pixels within the predetermined region is not larger than a predetermined number.

6. The image processing apparatus according to claim 4, wherein, for the local region categorized into the first or the second thick line after being categorized initially into the thin line by the sorting unit, the processing unit performs the processing for the first or the second thick line and thereafter repeats the processing for a local region shifted by one pixel in a predetermined direction from the local region.

7. The image processing apparatus according to claim 2, wherein the processing unit performs a processing for the first thick line for the local region categorized into the first thick line by the sorting unit or for both the local region and neighboring pixels present around the local region or performs a processing for the second thick line for the local region categorized into the second thick line or for both the local region and neighboring pixels present around the local region.

8. The image processing apparatus according to claim 7, wherein the first thick line is a C1 color thick line, the second thick line is a C2 color thick line, and the processing unit exchanges mutual relations of the target colors C1 and C2 for each other and thereby performs one of the processing for the first thick line and the processing for the second thick line for the local region categorized into the first or the second thick line.

9. The image processing apparatus according to claim 7, wherein the processing unit comprises a rough angle calculation part that, at the time of performing the processing for the first or the second thick line, determines to which of vertical and horizontal directions a direction of the thick line belongs, an exact angle calculation part that determines an angle of the thick line on the basis of the result of the determination made by the rough angle calculation part, and a pixel value output part that outputs pixel values in accordance with a result of the determination made by the exact angle calculation part.

10. The image processing apparatus according to claim 9, wherein the rough angle calculation part determines, based on neighboring pixel values around the local region, to which of the vertical and horizontal directions the direction of the thick line belongs.

11. The image processing apparatus according to claim 9, wherein, in accordance with the horizontal or vertical direction determined by the rough angle calculation part, the exact angle calculation part detects continuity of a predetermined pattern in the determined direction and thereby determines the angle of the thick line.

12. The image processing apparatus according to claim 9, wherein when the horizontal or vertical direction determined by the rough angle calculation part satisfies a predetermined condition, the exact angle calculation part determines that the direction is a 45° direction, then detects continuity of a predetermined pattern in the 45° direction and thereby determines an angle of the thick line.

13. The image processing apparatus according to claim 9, wherein the rough angle calculation part determines to which of the vertical and horizontal directions the direction of the thick line belongs based on pixel values present within a block not larger than a predetermined 3×3 pixel size including the local region.

14. The image processing apparatus according to claim 1, wherein the sorting unit categorizes the plurality of local regions into at least first and second patters, the first pattern being a pattern with predetermined three pixels being the target color C1 and one pixel being the target color C2, and the second pattern being a pattern with predetermined three pixels being the target color C2 and one pixel being the target color C1.

15. The image processing apparatus according to claim 14, wherein the processing unit determines the pixel values for the first pattern in accordance with locations of adjacent pixels having the target color C2, and determines the pixel values for the second pattern in accordance with locations of adjacent pixels having the target color C1.

16. An image processing apparatus to perform an image quality improving process for an original color image data, comprising:
a target color selecting unit that selects two target colors C1 and C2 for each local region of a plurality of local regions of the original color image data, the local region being a 2×2 pixel block having four pixel locations, the target color C1 being a pixel color of a first single pixel in the local region, each first single pixel of each local region being in a same first pixel location, and the target color C2 being a pixel color of a second single pixel in the local region, each second single pixel of each local region being in a same second pixel location, the first and second pixel locations being different, so that the two target colors C and C2 are selected from the first and second pixel locations and the target color selecting unit does not select, for each local region, colors from any other pixel location than the first and second pixel locations;
a sorting unit that categorizes the local region based on a layout of the target colors selected by the target color selecting unit;
a processing unit that performs, based on the target colors C1 and C2, an image quality improving process corresponding to a result of the categorizing performed by the sorting unit;
an enhancing unit that performs at least one of an antialiasing process and an antialiasing-enlarging process as the image quality improving process for the original color image data; and
a controller for controlling the processing of the target color selecting unit, the sorting unit and the processing unit,
wherein the target color selecting unit selects the two target colors C1 and C2 for each local region independently of selecting two target colors C1 and C2 for any of the remaining local region or regions, and
the original color image data is formed of image pixels, the image pixels containing more than two different colors.

17. The image processing apparatus according to claim 16, further comprising an enlarging unit that enlarges the original color image data and a storage unit that stores the image enlarged by the enlarging unit, the enlarged image stored in the storage unit being improved in image quality as the original color image data.

18. An image processing method to perform an enlarging process for an original color image data, comprising using a hardware controller to perform the steps of:
selecting two target colors C1 and C2 for each local region of a plurality of local regions of the original color image data, the local region being a 2×2 pixel block having four pixel locations, the target color C1 being a pixel color of a first single pixel in the local region, each first single pixel of each local region being in a same first pixel location, and the target color C2 being a pixel color of a second single pixel in the local region, each second single pixel of each local region being in a same second pixel location, the first and second pixel locations being different, so that the two target colors C1 and C2 are selected from the first and second pixel locations;
not selecting, for each local region, colors from any other pixel location than the first and second pixel locations;
categorizing the local region based on a layout of the selected target colors;
determining pixel values after enlargement from the target colors C1 and C2 in accordance with a result of the categorizing;

enlarging the original color image data based on the determined pixel values, and performing at least one of an antialiasing process and an antialiasing-enlarging process as an image quality improving process for the original color image data, wherein the selecting two target colors C1 and C2 for each local region is performed independently of selecting two target colors C1 and C2 for any of the remaining local region or regions, and the original color image data is formed of image pixels, the image pixels containing more than two different colors.

19. The image processing method according to claim 18, wherein the local region is categorized into any of a thin line, a first thick line and a second thick line.

20. The image processing method according to claim 19, wherein the first thick line is a C1 color thick line and the second thick line is a C2 color thick line.

21. The image processing method according to claim 19, wherein the local region categorized into the thin line by the categorization of the local region is further categorized into at least one of the first thick line, the second thick and others based on neighboring pixel values around the local region.

22. The image processing method according to claim 21, wherein the local region categorized into the thin line by the categorization of the local region is further categorized into the first thick line when the total quantity of C1 color pixels within a predetermined region including the local region is not larger than a predetermined number or to the second thick line when the total quantity of C2 color pixels within the predetermined region is not larger than a predetermined number.

23. The image processing method according to claim 21, wherein for the local region categorized into the first or the second thick line after being categorized initially into the thin line by the categorizing of the local region, the processing for the first or the second thick line is performed and thereafter the processing is repeated for a local region shifted by one pixel in a predetermined direction from the local region.

24. The image processing method according to claim 19, wherein a processing for the first thick line is performed for the local region categorized into the first thick line as a result of the categorizing or for both the local region and neighboring pixel present around the local region, or a processing for the second thick line is performed for the local region categorized into the second thick line as a result of the categorizing or for both the local region and neighboring pixels present around the local region.

25. The image processing method according to claim 24, wherein the first thick line is a C1 color thick line, the second thick line is a C2 color thick line, and by exchanging mutual relations of the target colors C1 and C2 for each other, the local region categorized into the first or the second thick line is processed by one of the processing for the first thick line and the processing for the second thick line.

26. The image processing method according to claim 24, wherein, at the time of performing the processing for the first or the second thick line, a determination is made by a rough angle calculation part to which of vertical and horizontal directions a direction of the thick line belongs, an angle of the thick line is determined by an exact angle calculation part on the basis of a result of the determination made by the rough angle calculation part, and pixel values are outputted by a pixel value output part in accordance with the determined angle.

27. The image processing method according to claim 26, wherein the determination regarding to which of the vertical and horizontal directions the direction of the thick line belongs is made based on neighboring pixel values around the local region.

28. The image processing method according to claim 26, wherein, in accordance with to which of the vertical and horizontal directions the direction of the thick line belongs, the determination of the angle of the thick line is made by detecting continuity of a predetermined pattern in the determined direction.

29. The image processing method according to claim 26, wherein when the horizontal or vertical direction determined as the thick line direction satisfies a predetermined condition, a determination is made that the direction is a 45° direction, and an angle of the thick line is determined by detecting continuity of a predetermined pattern in the 45° direction.

30. The image processing method according to claim 26, wherein a determination is made to which of the vertical and horizontal directions the direction of the thick line belongs based on pixel values present within a block not larger than a predetermined 3×3 pixel size including the local region.

31. The image processing method according to claim 18, wherein a checkered pattern with the target colors C1 and C2 adjacent to each other is categorized as a thin line, a pattern with predetermined three pixels being the target color C1 and one pixel being the target color C2 is categorized as a first thick line, and a pattern with predetermined three pixels being the target color C2 and one pixel being the target color C1 is categorized as a second thick line.

32. An image processing method to perform an image quality improving process for an original color image data, comprising using a hardware controller to perform the steps of:

selecting two target colors C1 and C2 for each local region of a plurality of local regions of the original color image data, the local region being a 2×2 pixel block having four pixel locations, the target color C1 being a pixel color of a first single pixel in the local region, each first single pixel of each local region being in a same first pixel location, and the target color C2 being a pixel color of a second single pixel in the local region, each second single pixel of each local region being in a same second pixel location, the first and second pixel locations being different, so that the two target colors C1 and C2 are selected from the first and second pixel locations;

not selecting, for each local region, colors from any other pixel location than the first and second pixel locations;

categorizing the local region based on a layout of the selected target colors;

performing an image quality improving process on the original color image data resulting in an image with improved image quality, the image quality improving process corresponding to a result of the categorizing based on the target colors C1 and C2; and performing at least one of an antialiasing process and an antialiasing-enlarging process as the image quality improving process for the original color image data, wherein the selecting two target colors C1 and C2 for each local region is performed independently of selecting two target colors C1 and C2 for any of the remaining local region or regions, and the original color image data is formed of image pixels, the image pixels containing more than two different colors.

33. The image processing method according to claim 32, further comprising: enlarging the original color image data, storing the enlarged image in a storage unit, and improving the image quality of the enlarged image stored in the storage unit as the original color image data.

34. A storage medium readable by a computer, the storage medium storing a program of instructions executable by the computer to perform a function for enlarging an original color image data, the function comprising using a hardware controller to perform the steps of:
 selecting two target colors C1 and C2 for each local region of a plurality of local regions of the original color image data, the local region being a 2×2 pixel block having four pixel locations, the target color C1 being a pixel color of a first single pixel in the local region, each first single pixel of each local region being in a same first pixel location, and the target color C2 being a pixel color of a second single pixel in the local region, each second single pixel of each local region being in a same second pixel location, the first and second pixel locations being different, so that the two target colors C1 and C2 are selected from the first and second pixel locations;
 not selecting, for each local region, colors from any other pixel location than the first and second pixel locations;
 categorizing the local region based on a layout of the selected target colors;
 determining pixel values after enlargement from the target colors C1 and C2 in accordance with a result of the categorizing;
 enlarging the original color image data based on the determined pixel values; and
 performing at least one of an antialiasing process and an antialiasing-enlarging process as the image quality improving process for the original color image data,
 wherein the selecting two target colors C1 and C2 for each local region is performed independently of selecting two target colors C1 and C2 for any of the remaining local region or regions, and
 the original color image data is formed of image pixels, the image pixels containing more than two different colors.

* * * * *